United States Patent
Kuwayama et al.

(10) Patent No.: US 8,922,598 B2
(45) Date of Patent: Dec. 30, 2014

(54) DISPLAY DEVICE

(75) Inventors: Tetsuro Kuwayama, Tokyo (JP); Satoshi Tomioka, Kanagawa (JP)

(73) Assignee: Sony Corporation (JP)

(*) Notice: Subject to any disclaimer, the term of this patent is extended or adjusted under 35 U.S.C. 154(b) by 278 days.

(21) Appl. No.: 13/421,422

(22) Filed: Mar. 15, 2012

(65) Prior Publication Data

US 2012/0274667 A1 Nov. 1, 2012

(30) Foreign Application Priority Data

Apr. 27, 2011 (JP) ................. 2011-098911

(51) Int. Cl.
 G09G 5/10 (2006.01)
 G09G 3/34 (2006.01)
 H04N 13/04 (2006.01)
(52) U.S. Cl.
 CPC ............. *G09G 5/10* (2013.01); *G09G 2310/08* (2013.01); *G09G 2320/064* (2013.01); *G09G 3/342* (2013.01); *H04N 13/0438* (2013.01); *G09G 2320/0233* (2013.01); *G09G 2310/024* (2013.01)
 USPC ................. 345/690; 345/98; 345/87
(58) Field of Classification Search
 None
 See application file for complete search history.

(56) References Cited

U.S. PATENT DOCUMENTS

2003/0016205 A1 1/2003 Kawabata et al.
2010/0188439 A1* 7/2010 Sugimoto et al. ............. 345/690

FOREIGN PATENT DOCUMENTS

JP 2000-321551 11/2000

OTHER PUBLICATIONS

European Patent Office, Extended European Search Report issued in connection with European Patent Application No. 12164778.8, dated Jun. 26, 2012. (8 pages).

* cited by examiner

*Primary Examiner* — Joseph Haley
*Assistant Examiner* — Ifedayo Iluyomade
(74) *Attorney, Agent, or Firm* — Sheridan Ross P.C.

(57) ABSTRACT

A display device includes: a transmission-type display member having a display area that is sequentially scanned; and an illumination member that is arranged on a rear face of the display member and includes a plurality of illumination units that are arranged so as to be aligned in a direction from one end portion side toward the other end portion side along a direction in which the display area is sequentially scanned. The illumination unit is in a light emitting state over a predetermined light emitting period after sequential scanning of display units formed from a portion of the display area, which corresponds to the illumination unit, is completed, and the illumination units are sequentially scanned from one end portion side to the other end portion side in accordance with the sequential scanning of the display area.

8 Claims, 23 Drawing Sheets

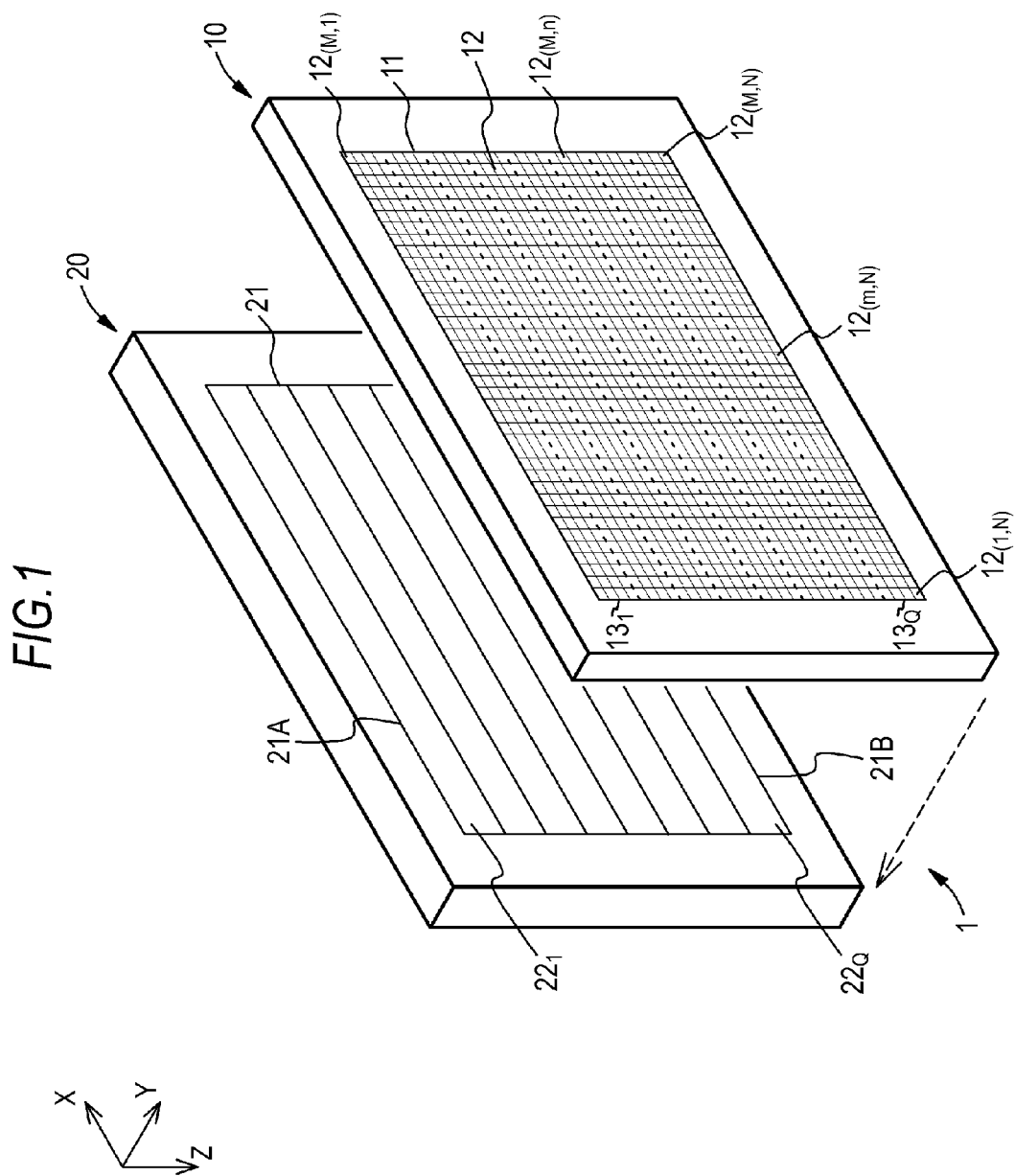

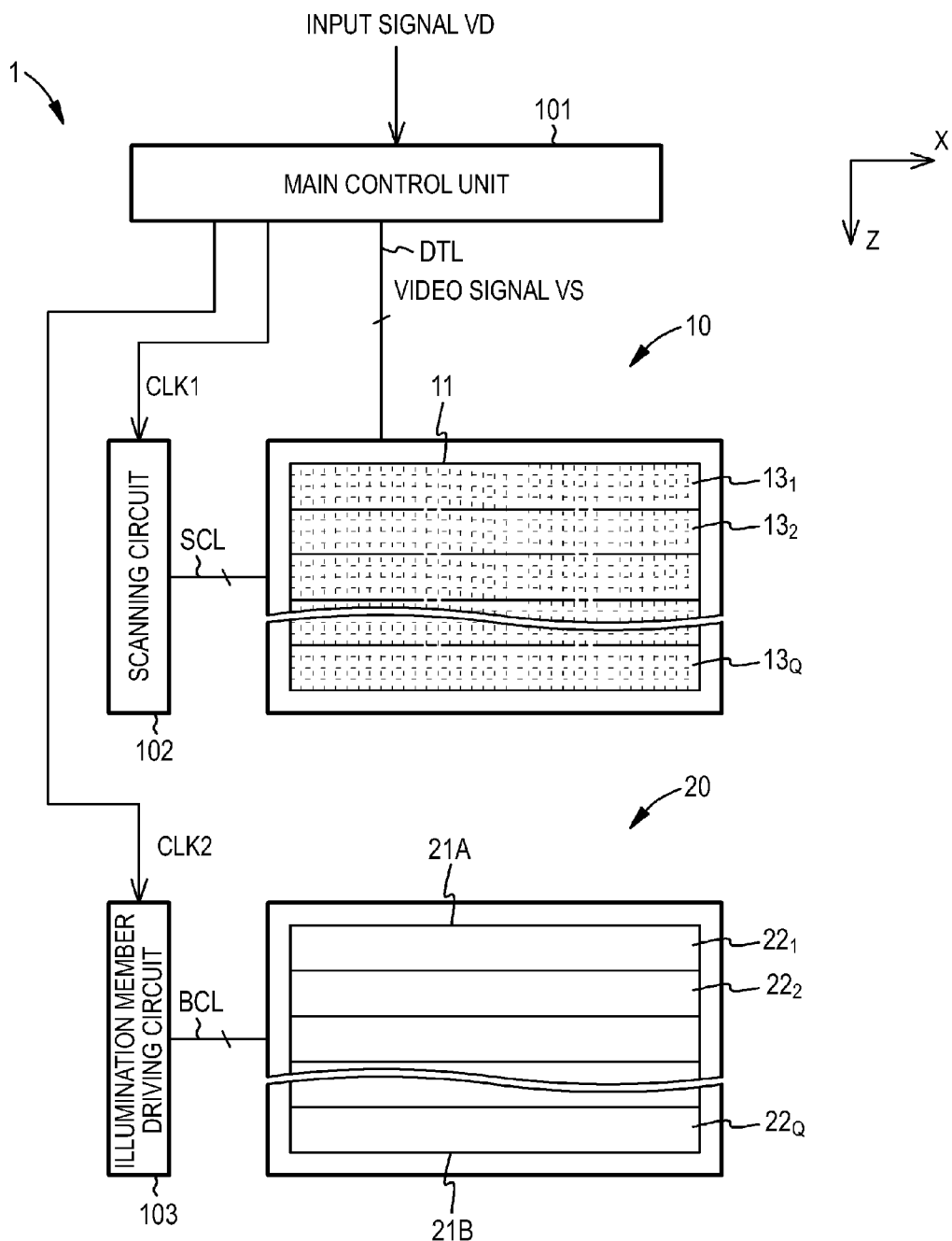

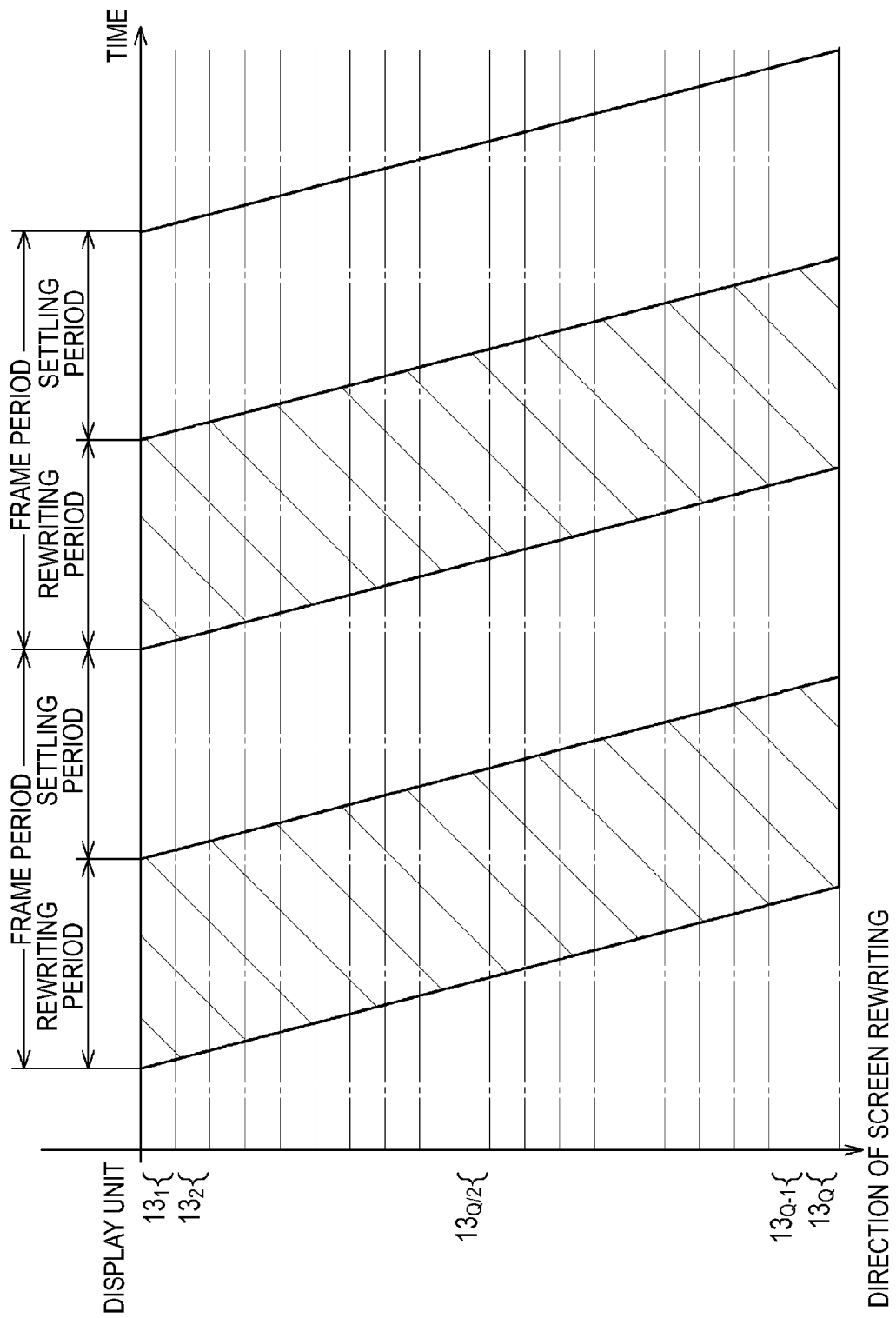

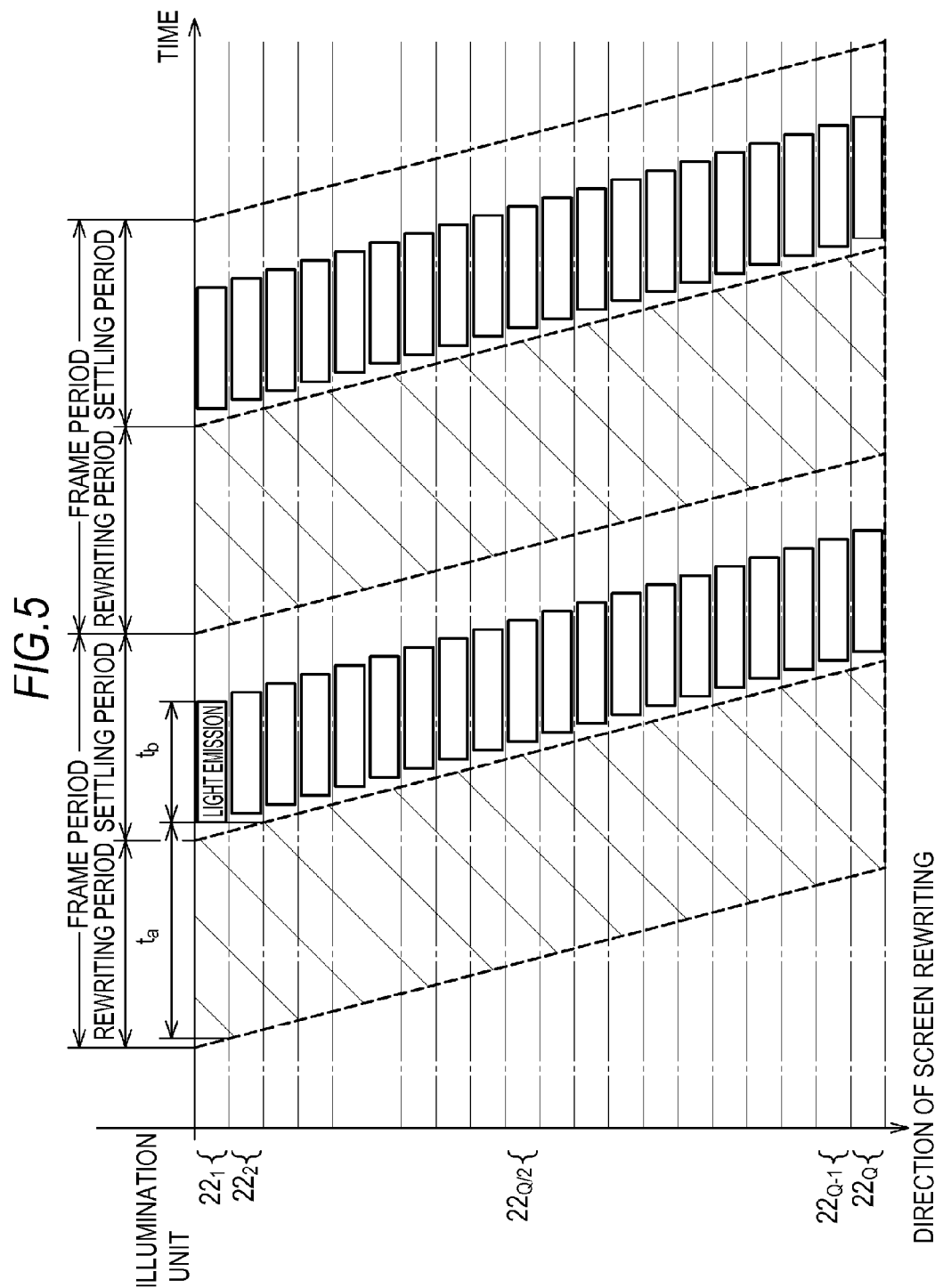

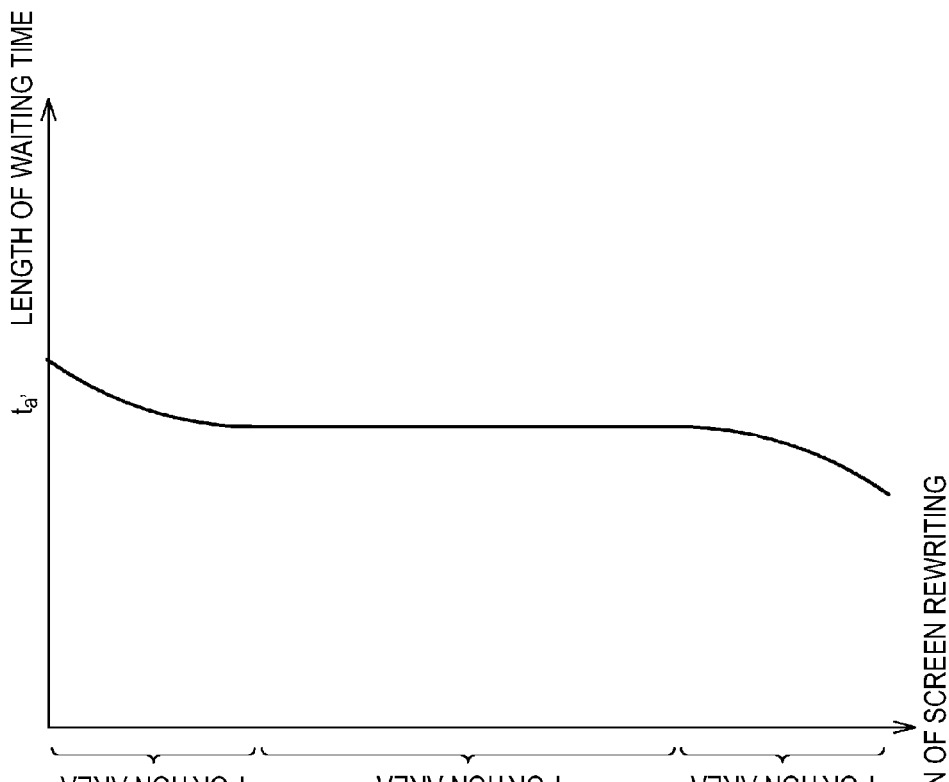
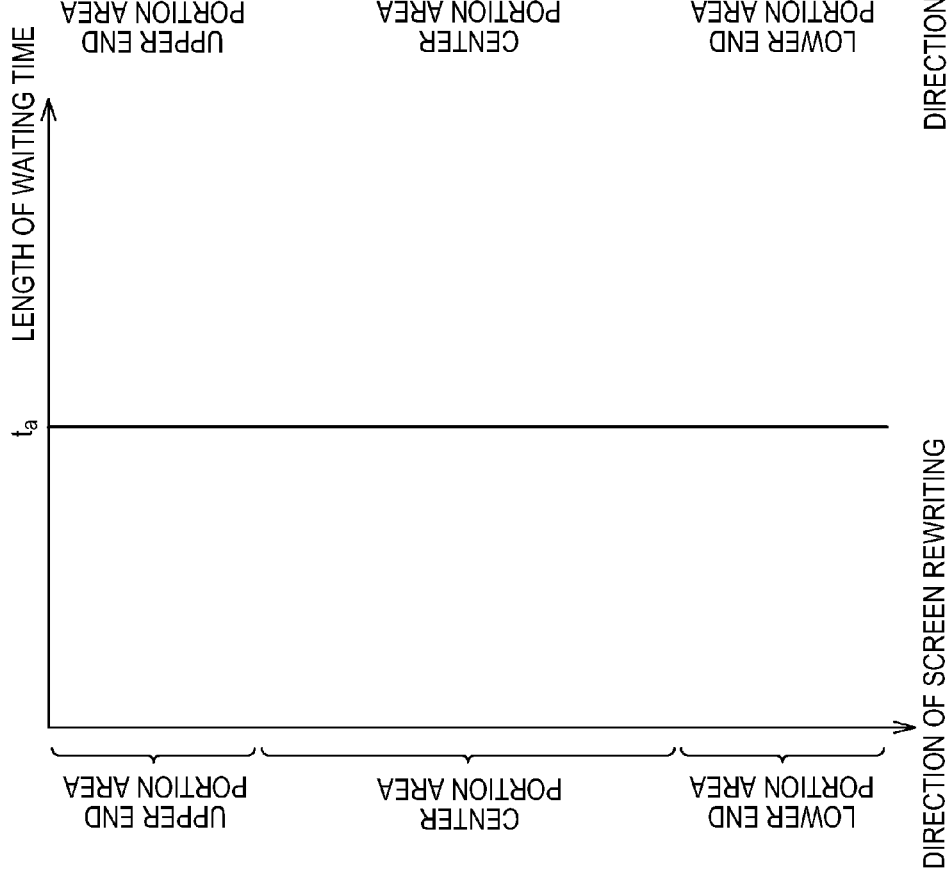

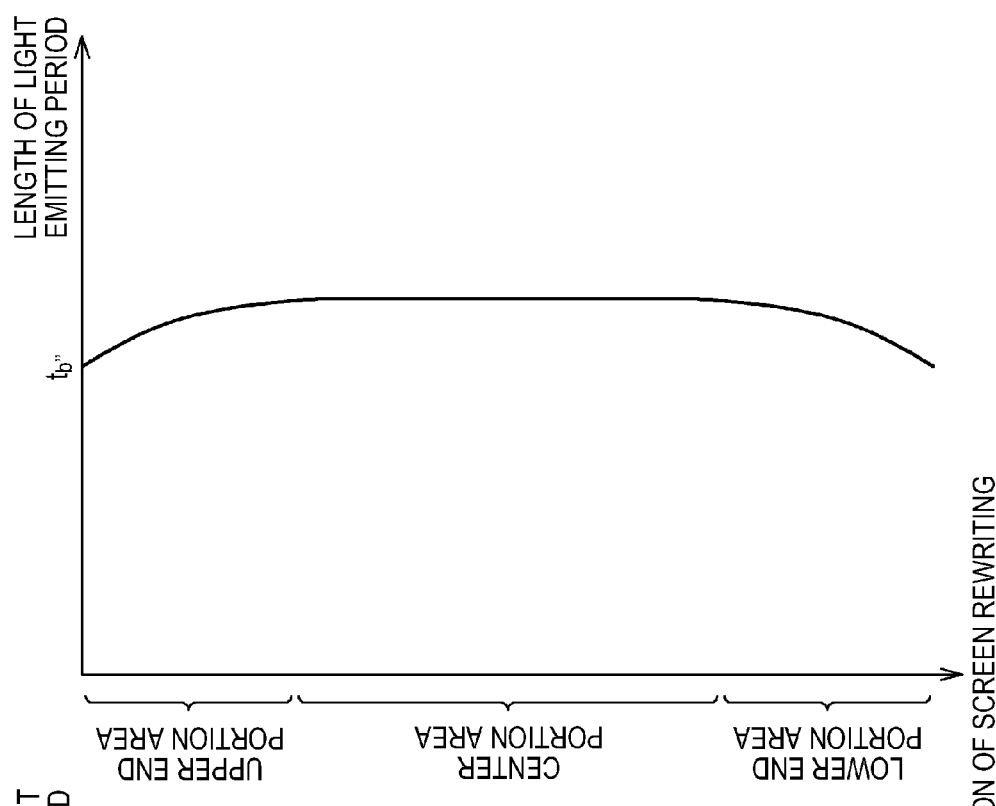
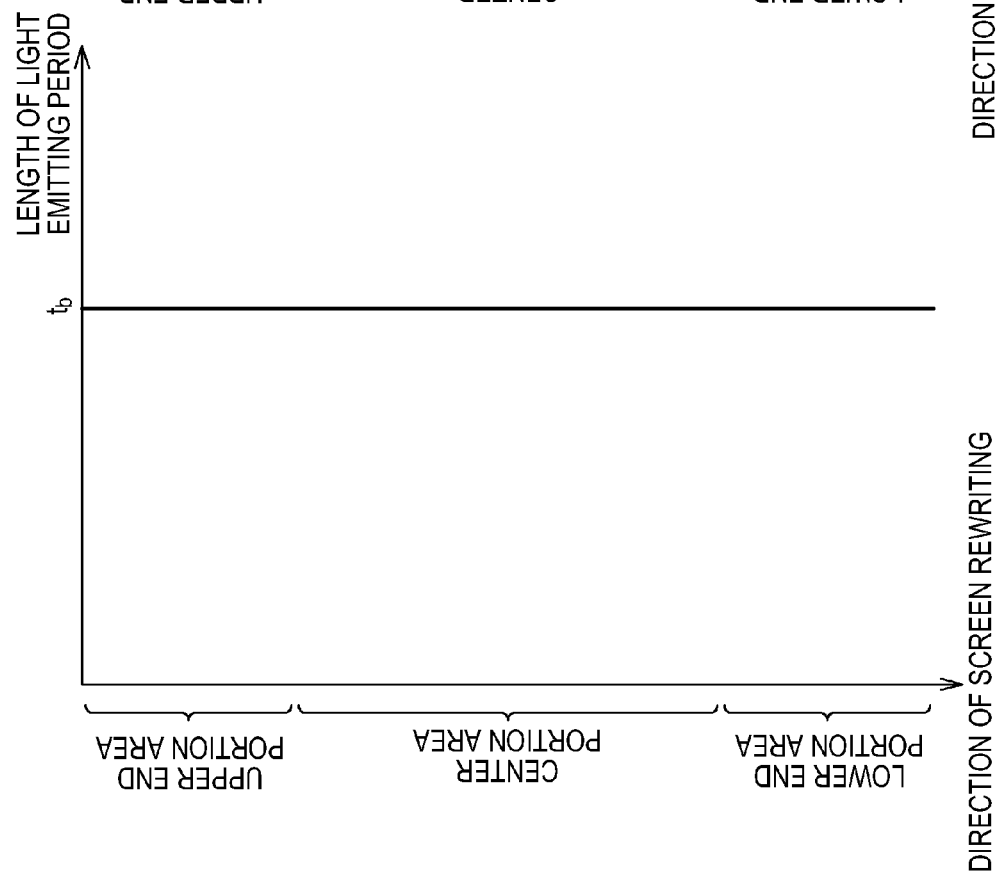

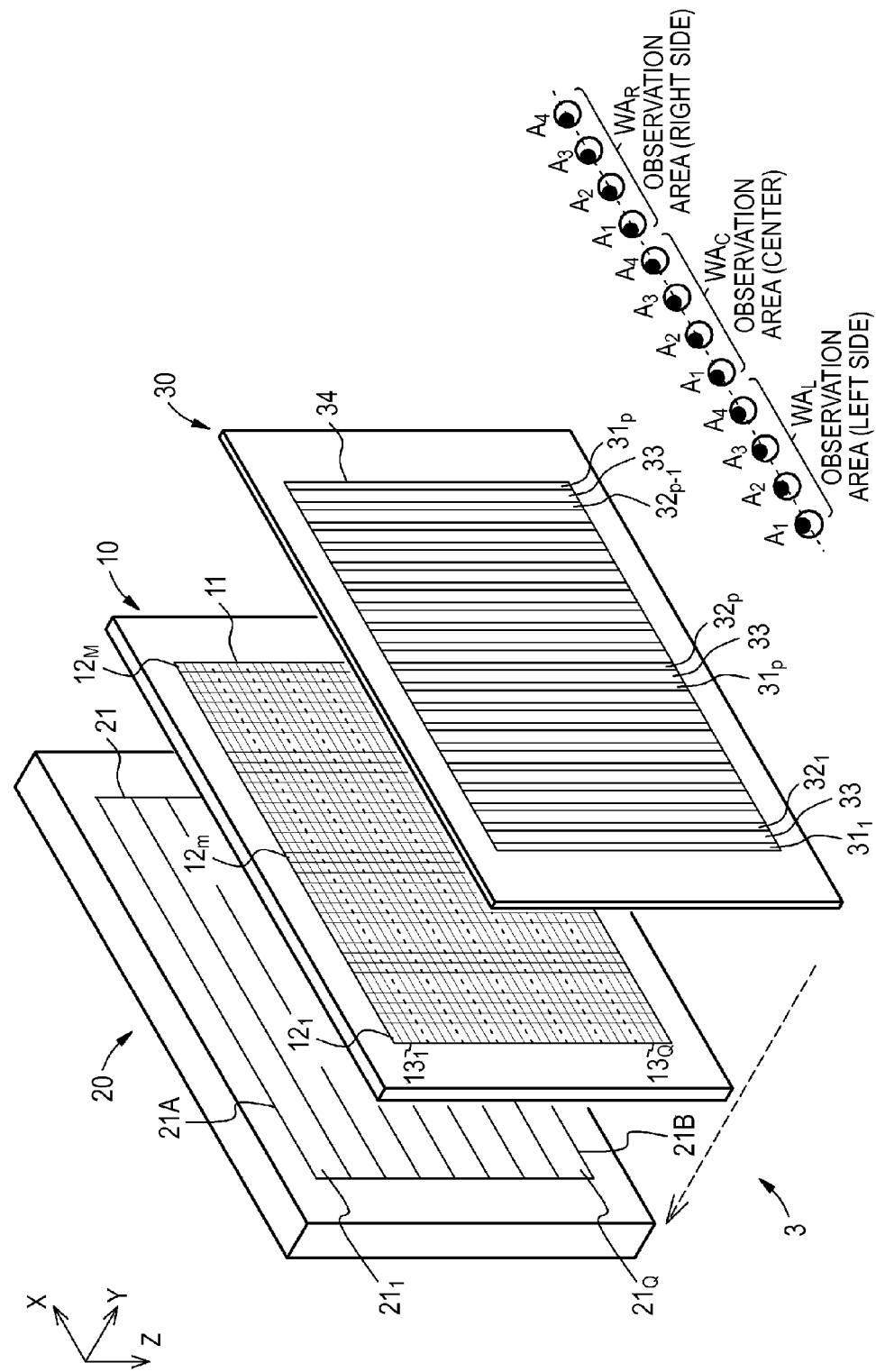

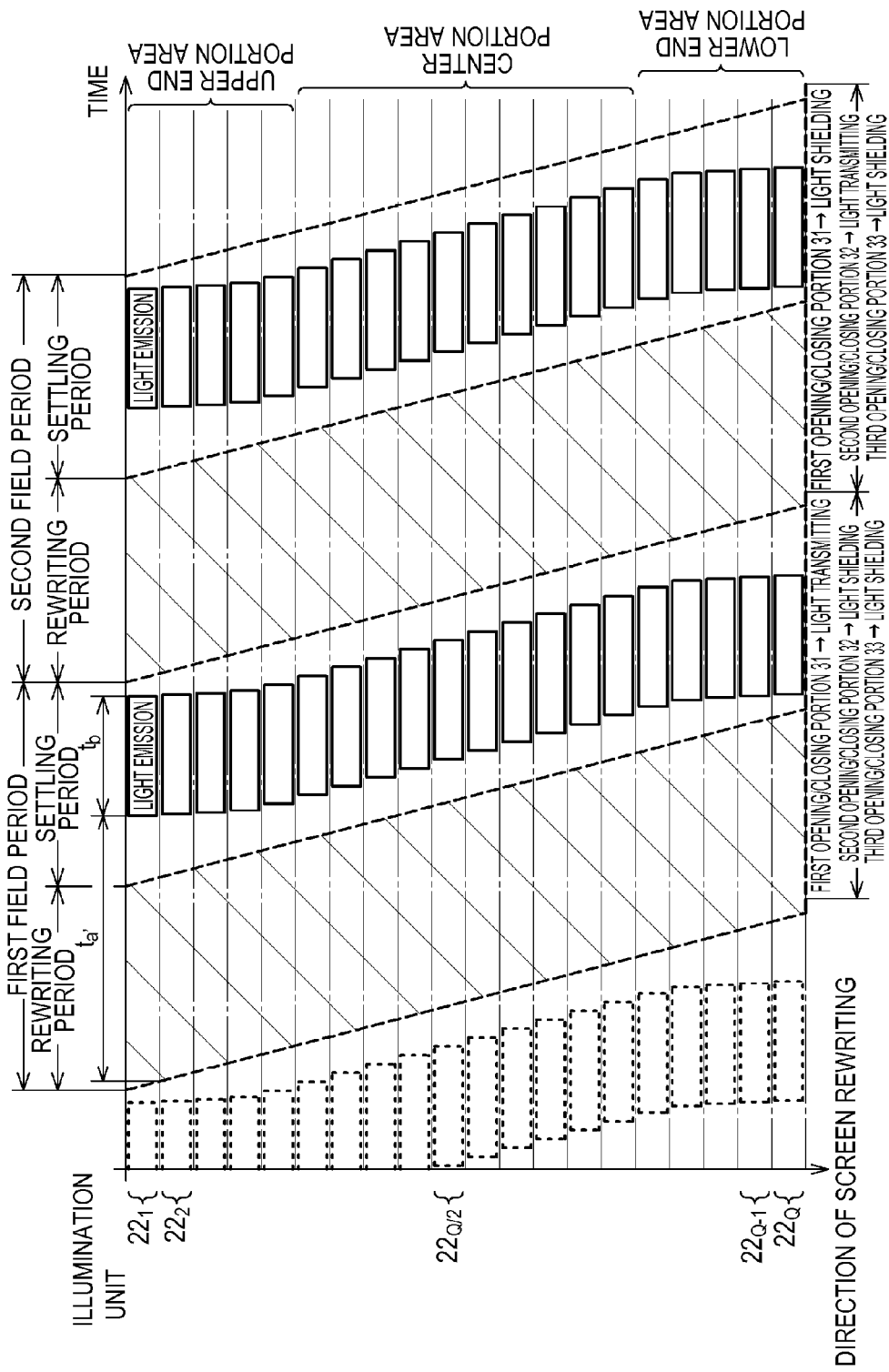

DISPLAY DEVICE

CROSS REFERENCES TO RELATED APPLICATIONS

The present application claims priority to Japanese Priority Patent Application JP 2011-098911 filed in the Japan Patent Office on Apr. 27, 2011, the entire content of which is hereby incorporated by reference.

BACKGROUND

The present disclosure relates to a display device.

A display device is known having a configuration in which switching between a light emitting area and a non-light emitting area is sequentially performed by scanning an illumination unit of a direct under type in synchronization with the scanning of a transmission-type display unit such as a liquid crystal display panel, for example, as disclosed in JP-A-2000-321551. According to such a display device, a moving image blur is decreased in a hold-type driving display panel so as to improve the performance of displaying a moving image.

SUMMARY

In an illumination unit having a configuration in which the boundary between a light emitting area and a non-light emitting area is clearly visually recognized, a bright line or a dark line is visually recognized near the boundary according to the scanning of the illumination unit, whereby luminance unevenness occurs in a displayed image. Accordingly, commonly, the illumination unit is design such that light emitted from a light source that corresponds to the light emitting area reaches the non-light emitting area to some degree. However, since light is also emitted from the illumination unit to a display area of a portion for which update has not been completed, a phenomenon occurs in which images are visually recognized to overlap each other in two consecutive frames, whereby the image separation characteristics are degraded.

It is therefore desirable to provide a display device capable of alleviating degradation of the image separation characteristics.

An embodiment of the present disclosure is directed to a display device including: a transmission-type display member having a display area that is sequentially scanned; and an illumination member that is arranged on a rear face of the display member and includes a plurality of illumination units that are arranged so as to be aligned in a direction from one end portion side toward the other end portion side along a direction in which the display area is sequentially scanned. The illumination unit is in a light emitting state over a predetermined light emitting period after sequential scanning of display units formed from a portion of the display area, which corresponds to the illumination unit, is completed, and the illumination units are sequentially scanned from one end portion side to the other end portion side in accordance with the sequential scanning of the display area, and a length of a waiting time from when the sequential scanning of the display unit is completed to when the corresponding illumination unit is in the light emitting state is set to be nonlinearly decreased in accordance with a sequence of the scanning of the illumination units at least in an area located on one end portion side.

According to the display device of the embodiment of the present disclosure, the length of the waiting time from when the sequential scanning of the display units is completed to when the corresponding illumination unit is in the light emitting state is set to be nonlinearly decreased in accordance with the sequence of the scanning of the illumination unit at least in an area located on one end portion side. Accordingly, the degree of light emission of the illumination member is decreased even in an area in which the update of the display panel is not completed. Therefore, the degradation of the image separation characteristics can be decreased.

Additional features and advantages are described herein, and will be apparent from the following Detailed Description and the figures.

BRIEF DESCRIPTION OF THE FIGURES

FIG. 1 is a schematic perspective view of a display device according to a first embodiment when it is virtually divided.

FIG. 3 is a conceptual diagram of the display device according to the first embodiment.

FIG. 4 is a schematic diagram illustrating the scanning of a display member.

FIG. 5 is a schematic diagram illustrating the scanning of an illumination member according to a reference example.

FIG. 12A is a schematic graph illustrating the relation between the scanning of the illumination member according to the reference example and a waiting time, and FIG. 12B is a schematic graph illustrating the relation between the scanning of the illumination member according to the first embodiment and a waiting time.

FIG. 17A is a schematic diagram illustrating a light emitting period of the illumination member according to the first embodiment, and FIG. 17B is a schematic graph illustrating a light emitting period of the illumination member according to the second embodiment.

FIG. 18 is a schematic perspective view of a display device according to a third embodiment when it is virtually divided.

FIG. 23 is a schematic diagram illustrating the scanning of the illumination member and the operation of the optical splitting unit according to the third embodiment.

DETAILED DESCRIPTION

Figure 2A:
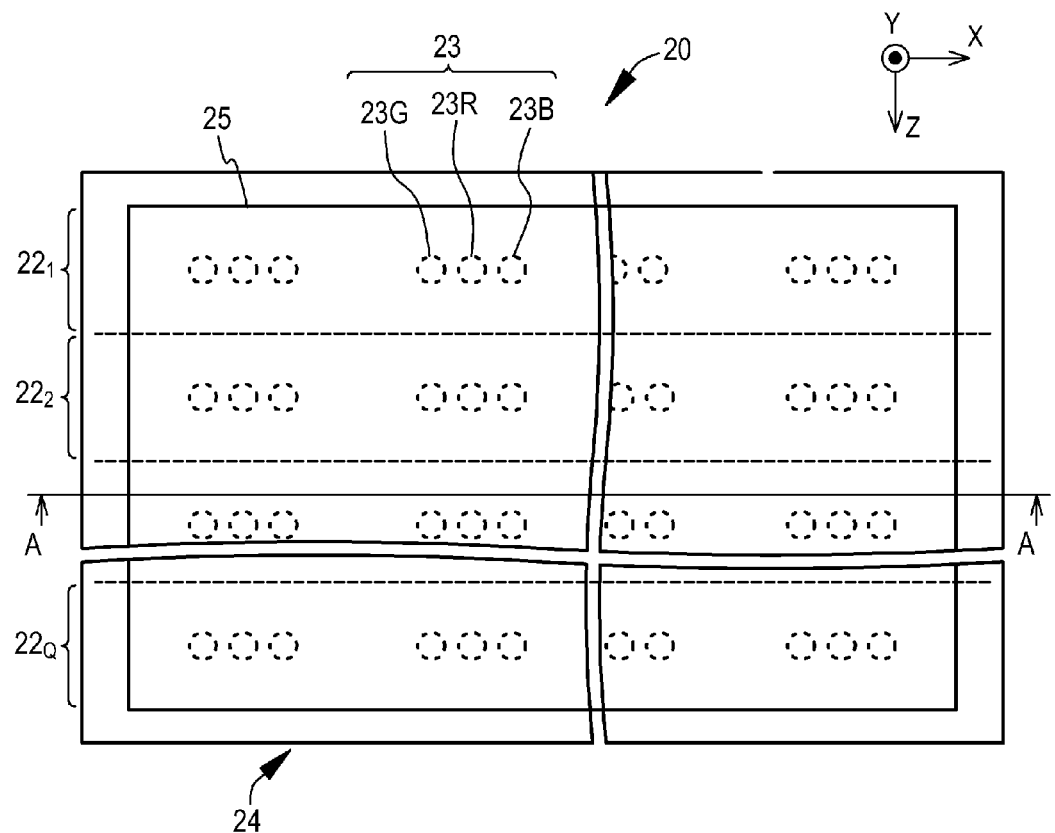
FIG. 2A is a schematic plan view of an illumination member.

Hereinafter, display devices according to embodiments of the present disclosure will be described with reference to the accompanying drawings. However, the present disclosure is not limited to the embodiments, and various numeric values or materials represented in the embodiments are examples. In the description presented below, the same reference sign is assigned to the same elements or elements having the same function, and duplicate description thereof will not be presented. The description will be presented in the following order.

1. Overall Description of Display Device According To Embodiments of Present Disclosure
2. First embodiment
3. Second Embodiment
4. Third Embodiment (and Others)

Overall Description of Display Device According to Embodiments of Present Disclosure As described above, a display device according to an embodiment of the present disclosure includes: a transmission-type display member that has a display area that is sequentially scanned; and an illumination member that is arranged on the rear face of the display member and includes a plurality of illumination units that are arranged so as to be aligned in a direction from one end portion side toward the other end portion side along a direction in which the display area is sequentially scanned. The illumination units are in the light emitting state over a predetermined light emitting period after the sequential scanning of display units formed from a portion of the display area that corresponds to the illumination unit is completed, and the illumination units are sequentially scanned from one end portion side toward the other end portion side in accordance with the sequential scanning of the display area.

As the transmission-type display member that is used in an embodiment of the present disclosure, a known display member, for example, called a transmission-type liquid crystal display panel may be used. The display member may be either a monochrome display or a color display. In the embodiments to be described later, a transmission-type liquid crystal display panel of an active matrix type is used as the display member.

The liquid crystal display panel, for example, is formed from a front panel that includes a transparent common electrode, a rear panel that includes a transparent pixel electrode, and a liquid crystal material arranged between the front panel and the rear panel. Here, the operation mode of the liquid crystal display panel is not particularly limited. For example, the liquid crystal display panel may be configured to be driven in a so-called TN (Twisted Nematic) mode or may be configured to be driven in a VA (Vertical Alignment) mode or an IPS (In-Plane Switching) mode.

More particularly, the front panel, for example, is configured by a substrate that is formed from glass, a transparent common electrode (for example, formed from ITO (Indium Tin Oxide) disposed on the inner face of the substrate, and a polarizing film disposed on the outer face of the substrate. In the case of a color display, a color filter coated with an overcoat layer that is formed from an acrylic resin or an epoxy resin is disposed on the inner side of the substrate, and the transparent common electrode is formed on the overcoat layer. In addition, an orientation film is formed on the transparent common electrode as is necessary.

On the other hand, the rear panel, for example, is configured by a substrate that is formed from glass, a switching element formed on the inner face of the substrate, and a pixel electrode (for example, formed from ITO) that is controlled to be conductive/non-conductive by the switching element. In addition, on the outer face of the substrate, a polarizing film is disposed. An orientation film is formed on the whole face including the pixel electrode as is necessary.

Various members or materials configuring the liquid crystal display panel may be configured by known members or materials. As examples of the switching element, there are a three-terminal element such as a thin film transistor (TFT), and two-terminal elements such as a metal insulator metal (MIM) element, a varistor element, and a diode. To the switching element, for example, a scanning line extending in the row direction and a signal line extending in the column direction are connected.

In addition, as a semi-transparent type display member that has both characteristics of the reflection type and the transmission type, for example, a liquid crystal display panel of a semi-transmission type that has both a reflection-type display area and a transmission-type display area in pixels is known. Such a semi transmission-type display member may be used. In other words, in the "transmission-type display member", a "semi transmission-type display member" is included.

When the number of pixels M×N of the display member is denoted by (M, N), as the values of (M, N), particularly, there are VGA (640, 480), S-VGA (800, 600), XGA (1024, 768), APRC (1152, 900), S-XGA (1280, 1024), U-XGA (1600, 1200), HD-TV (1920, 1080), Q-X GA (2048, 1536), (3840, 2160), (1920, 1035), (720, 480), (1280, 960), and the like as examples of some of the resolutions for an image display. However, the present disclosure is not limited thereto.

In the display member, a display unit that is formed from a portion of the display area that corresponds to the illumination unit is basically configured to include pixels of predetermined rows aligned in the scanning direction. It is preferable that the numbers of the rows of pixels of the display units are configured to be the same. However, the present disclosure is not limited thereto.

It is preferable that the illumination member is configured to include three or more illumination units. In addition, it is preferable that a portion of the display area corresponding to at least about 10 to 20 rows corresponds to one illumination unit. From the viewpoint of performing fine control, it is preferable to increase the number of illumination units. However, since the scale of a circuit that drives the illumination member is increased in accordance with the number of the illumination units, the number of the illumination units may be selected based on the specifications or the design of the display device.

As examples of the light source of the illumination unit, there are a light emitting diode (LED), a cold cathode ray-type fluorescent lamp, an electroluminescence (EL) device, and the like. From the viewpoint of the miniaturization of the light source, among those, it is preferable that the light emitting diode is used as the light source. In such a case, white light can be acquired by configuring a red light emitting diode, a green light emitting diode, and a blue light emitting diode as one set. Alternatively, white light can be acquired by using white light emitting diode (for example, a light emitting diode that emits white light by combining an ultraviolet or blue light emitting diode and fluorescent particles). In addition, in the former case, light emitting diodes that emit a fourth color, a fifth color, • • • other than red, green, and blue may be further included.

The illumination member may be configured to include an optical functional sheet such as an optical diffusion sheet in addition to the above-described light source. In such a case, the optical functional sheet is arranged between the light source and the display member.

As described above, in the display device according to the embodiment of the present disclosure, the length of the waiting time until a corresponding illumination unit is in the light emitting state after the sequential scanning of display units is completed is set so as to be nonlinearly decreased in accordance with the scanning sequence of the illumination unit in at least one area located on the end portion side. The length of the waiting time may be configured to be nonlinearly decreased in accordance with the scanning sequence of the illumination unit in an area located on one end portion side, or the length of the waiting time may be configured to be nonlinearly decreased in accordance with the scanning sequence of the illumination unit in an area located on the other end portion side. Furthermore, the length of the waiting time may be configured to be nonlinearly decreased in accordance with the scanning sequence of the illumination unit in the area located on one end portion side and the area located on the other end portion side.

In the display device according to the embodiment of the present disclosure that includes the above-described various preferred configurations, a period after the illumination unit located on one end-portion side is in the light emitting state until the illumination unit located on the other end portion side is in the light emitting state may be configured to be shorter than a period from the start of the sequential scanning in the display area to the end thereof.

In the display device according to the embodiment of the present disclosure that includes the above-described various preferred configurations, a configuration may be employed in which the light emitting period of the illumination unit arranged in the end portion-side area is set to be shorter as the illumination unit is closer to the end portion side.

In the display device according to the embodiment of the present disclosure that includes the above-described various preferred configurations, the display device may be configured so as to further include an optical splitting unit that is used for splitting an image displayed on the display member into images for a plurality of viewpoints.

The configuration of the optical splitting unit is not particularly limited. As the optical splitting unit, a known member such as a parallax barrier or a lens sheet called a lenticular lens may be used. The optical splitting unit may have a fixed configuration or a configuration that can be dynamically changed.

For example, a parallax barrier having a fixed configuration may be formed using a known material by using a known method such as a combination of a photolithographic method and an etching method, any of various printing methods including a screen printing method or an ink jet printing method, a plating method including an electroplating method and an electroless plating method, or a lift-off method. On the other hand, a parallax barrier having a dynamic configuration, for example, may be configured by a light valve using a liquid crystal material. As a lens sheet having a fixed configuration, for example, a known lenticular lens may be used. In addition, as a lens sheet having a dynamic configuration, for example, a gradient index lens using a liquid crystal material may be used.

A main control unit that controls the display device may be configured by various circuits such as a video signal generating section, a data driver, and a timing controller. A scanning circuit that scans the display member may be configured by using a shift register circuit or the like, and an illumination member driving circuit that drives the illumination member may be configured by a shift register circuit, a light source driving circuit, and the like. An optical splitting driving circuit that drives the optical splitting unit may be configured by a shift register circuit or the like. These can be configured by using known circuit elements.

First Embodiment

A first embodiment relates to a display device according to the present disclosure.

Figure 2B:
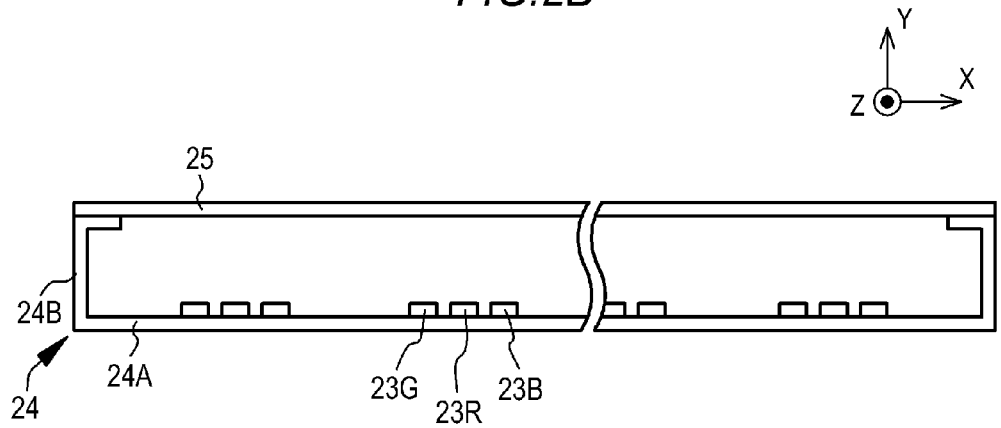
FIG. 2B is a schematic cross-sectional view when the illumination member is cut off along a line denoted by A-A shown in FIG. 2A.

FIG. 1 is a schematic perspective view of a display device according to the first embodiment when it is virtually divided. FIG. 2A is a schematic plan view of an illumination member. FIG. 2B is a schematic cross-sectional view when the illumination member is cut off along a line denoted by A-A shown in FIG. 2A.

As illustrated in FIG. 1, the display device 1 according to the first embodiment includes a transmission-type display member 10 including a display area 11 that is sequentially scanned and an illumination member 20 that is arranged on the rear face of the display member 10 and includes a plurality of illumination units 22 that are arranged so as to be aligned in a direction from one end portion 21A side toward the other end portion 21B side along a direction in which the display area 11 is sequentially scanned.

For convenience of the description, it is assumed that the display area 11 of the display member 10 is parallel to the X-Z plane, and the image observer side is the +Y direction. In addition, it is assumed that the planar shapes of a light emitting face 21 that is configured by a group of illumination units 22 and the display area 11 coincide with each other, and the planar shapes of the illumination units 22 are the same.

In the display area 11 of the display member 10, a total of M×N pixels 12 including M pixels arranged in the row direction (the X direction in the figure) and N pixels arranged in the column direction (the Z direction in the figure) are arranged. A pixel 12 positioned in the m-th row (here, m=1, 2, . . . , M) and the n-th column (here, n=1, 2, . . . , N) is denoted by an (m, n)-th pixel 12 or a pixel $12_{(m,n)}$. In addition, the m-th pixel 12 may be denoted by a pixel $12_m$. The number of pixels (M, N) of the display member 10, for example, is (1920, 1080). This applies the same to display members according to the other embodiments.

The display member 10 is formed from a liquid crystal display panel of the active matrix type. For convenience of the description, the liquid crystal display panel is assumed to perform a monochrome display. However, it is a merely an example.

The display member 10 is configured by a front panel that is located on the image observer side, a rear panel that is located on the illumination member 20 side, a liquid crystal material that is arranged between the front panel and the rear panel, and the like. For convenience of the description, the display member 10 is illustrated as one panel in FIG. 1.

The illumination member 20 of the so-called direct under type includes a plurality of (Q) illumination units 22. Each illumination unit 22 illuminates a display unit 13 that is formed from a portion of the display area that corresponds to the illumination unit 22 from the rear face. A light source that is included in the illumination unit 22 is controlled for each illumination unit 22.

As illustrated in FIGS. 2A and 2B, the illumination member 20 includes a casing 24 that includes a bottom face 24A and a side face 24B and light sources 23 (a red light emitting diode 23R, a green light emitting diode 23G, and a blue light emitting diode 23B) that are formed from a set of light emitting diodes arranged on the bottom face 24A in correspondence with the illumination units 22. In the example illustrated in FIGS. 2A and 2B, a set of a plurality of light emitting diodes is arranged in one illumination unit 22. Thus, white light having high color purity can be acquired as illumination light by mixing red light, green light, and blue light.

As will be described later, the illumination units 22 are sequentially scanned. The light source 23 of the scanned illumination unit 22 emits light, the light is transmitted through an optical functional sheet 25 that is formed from an optical diffusion sheet or the like, and irradiates the display unit 13 corresponding to the illumination unit 22 from the bottom face.

However, the configuration of the illumination member is not limited to the above-described configuration but may be configured (so-called an edge light type configuration) to include a light guiding plate that is formed from a transparent material such as acryl and a light source arranged on the side face of the light guiding plate.

FIG. 3 is a conceptual diagram of the display device according to the first embodiment.

The display device 1 is driven by a main control member 101 to which a signal is input from the outside, a scanning circuit 102 that scans the display member 10, and an illumination member driving circuit 103 that drives the illumination member 20. In FIG. 1, circuits including the main control member 101, the scanning circuit 102, and the illumination member driving circuit 103 are not illustrated.

An input signal VD corresponding to an image to be displayed is input to the main control member 101. The main control member 101 generates video signals VS based on the input signal VD and sequentially applies the video signals VS to data lines DTL of the display member 10.

In addition, the main control member 101 generates a clock signal CLK1 that is used for controlling the scanning timing of the scanning circuit 102 for the display area and a clock signal CLK2 that is used for controlling the scanning timing of the illumination member driving circuit 103 for the illumination unit 22. The main control member 101, for example, can be configured by known circuits called a logic circuit, a latch circuit, and a shift register circuit. In addition, the scanning circuit 102, for example, can be configured by using a known circuit such as a shift register circuit and the like, and the illumination member driving circuit 103 can be configured by using known circuits such as a shift register circuit, a light source driving circuit, and the like.

The scanning circuit 102 sequentially scans the display area 11 by sequentially applying scanning signals to scanning lines SCL. More particularly, in the first embodiment, line sequential scanning is performed for each line. The direction of the scanning is the Z direction. The illumination member driving circuit 103 sequentially scans the illumination units 22 by sequentially applying control signals to control lines BCL.

However, the line sequential scanning is not limited to be configured so as to be performed for each line. The display member, for example, may be configured such that data lines are independently arranged in correspondence with odd lines and even lines, and line sequential scanning for two lines is performed once. In other words, the "line sequential scanning" includes a form in which a plurality of lines are simultaneously scanned in addition to the configuration in which scanning is performed for each line.

The display area 11 that is configured by the pixels 12 arranged in a two-dimensional matrix pattern is virtually divided into Q display units 13. When this state is represented by a "row" and a "column", the display unit 13 can be stated to be divided into display units of Q rows and one column.

Since the planar shapes of the illumination units 22 are the same, basically, the display unit 11 is divided into equal parts. In such a case, the display unit 13 can be stated to be configured by pixels 12 of (N/Q) rows and M columns. For example, when (M, N)=(1920, 1080), and Q=20, the display unit 13 is configured by pixels 12 of 54 rows and 1920 columns. In addition, in a case where there is a fraction after the decimal point in (N/Q), it may be appropriately distributed to the display units.

FIG. 4 is a schematic diagram illustrating the scanning of the display member.

The display area 11 is sequentially scanned toward the Z direction. Accordingly, in order to display one frame, first, the pixels 12 configuring a display unit $13_1$ are scanned, and thereafter, pixels 12 configuring each display unit 13 are scanned in the order of display units $13_2, 13_3, \ldots, 13_{Q-1}, 13_Q$. In addition, in order to settle an operation of recording a new video signal into a pixel 12 or the state of the pixel recording operation after that, a predetermined period is necessary. When this period is represented as a rewriting period, and the remaining period is represented as a settling period, the scanning of the display member 10 can be schematically represented as in FIG. 4. In addition, in order to further prompt the settling of the pixel state, a configuration may be employed in which the same data is written twice. In such a case, for example, the settling period may be handled to be started in accordance with the end of the second recording operation.

In the first embodiment, based on the operation of the main control member 101 and the like, the length of the waiting time after the sequential scanning of the display units 13 is completed until the corresponding illumination unit 22 is in the light emitting state is set to be nonlinearly decreased in accordance with the scanning sequence of the illumination unit 22 at least in an area located on one end portion side. More particularly, the length of the waiting time is set to be nonlinearly decreased in accordance with the scanning sequence of the illumination unit 22 in an area located on one end portion side and in an area located on the other end portion side. First, in order to help the understanding of the present disclosure, the operation of a reference example in which the length of the waiting time is set to be constant regardless of the scanning sequence of the illumination unit 22 and the problems therein will be described.

FIG. 5 is a schematic diagram illustrating the scanning of the illumination member according to a reference example.

In the operation according to the reference example, the length of the waiting time is set to be constant regardless of the scanning sequence of the illumination unit 22. For convenience of the description, the length of the waiting time in the reference example is assumed to be the length of a time after the scanning of a display unit 13 ends until the settling period of a display unit 13 that is located below the above-described display unit 13 by one level. When the waiting time is denoted by $t_a$, and the light emitting period of the illumination unit 22 is denoted by $t_b$, the scanning of the illumination member 20 can be schematically represented as in FIG. 5. In addition, a broken line illustrated in FIG. 5 represents the scanning timing of the display member 10 illustrated in FIG. 4.

In a case where the light emitting period of each illumination unit 22 is included within the settling period of the corresponding display unit 13, theoretically, images of two frames are not visually recognized to overlap each other. However, light emitted from the light source 23 of the illumination unit 22 reaches the other illumination units 22, and accordingly, images of two frames are visually recognized to overlap each other. Hereinafter, the description will be presented with reference to FIGS. 6 to 10.

Figure 6:
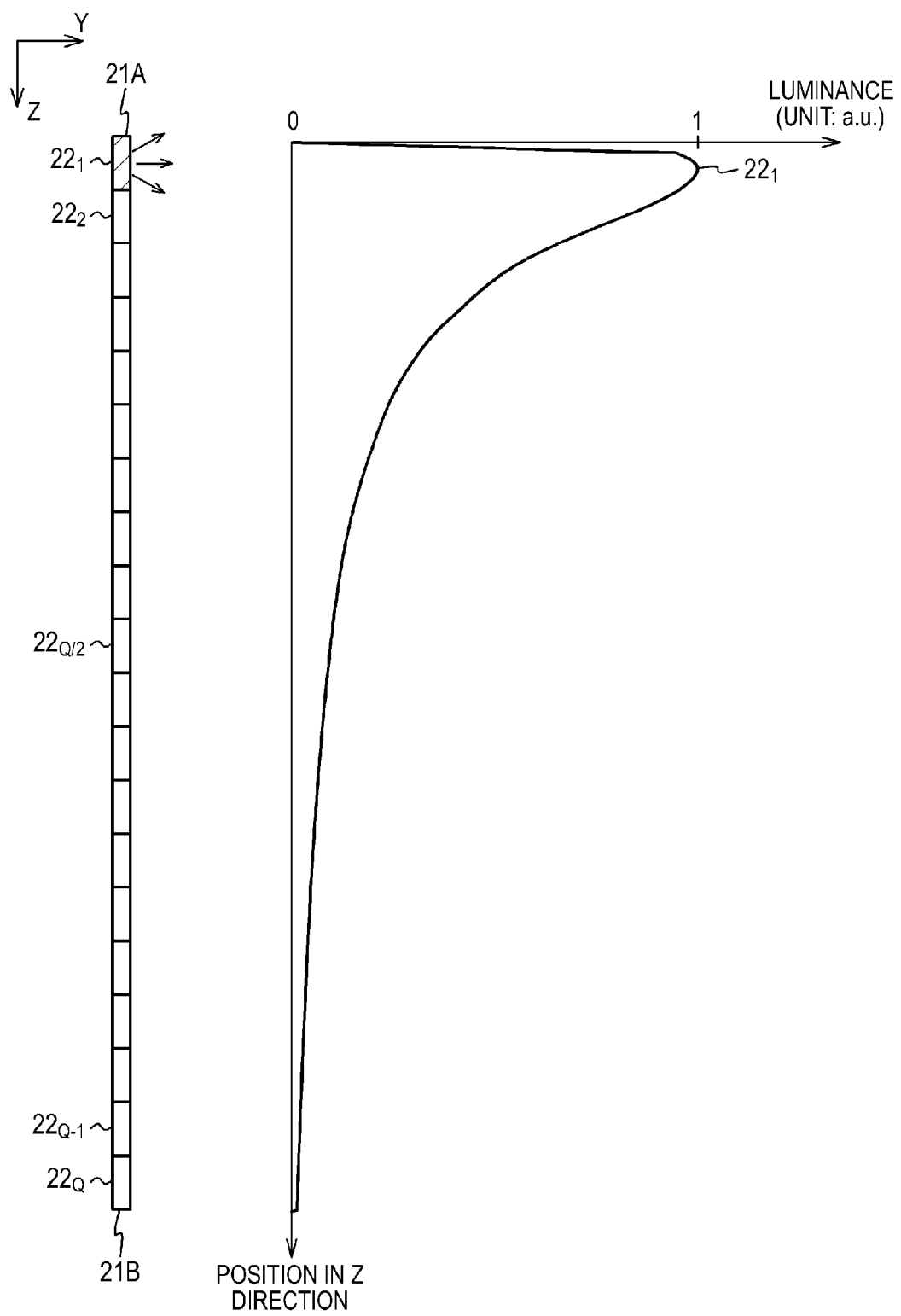
FIG. 6 is a schematic graph illustrating the luminance distribution of an illumination member when a light source corresponding to an illumination unit positioned in the first row emits light.
Figure 7:
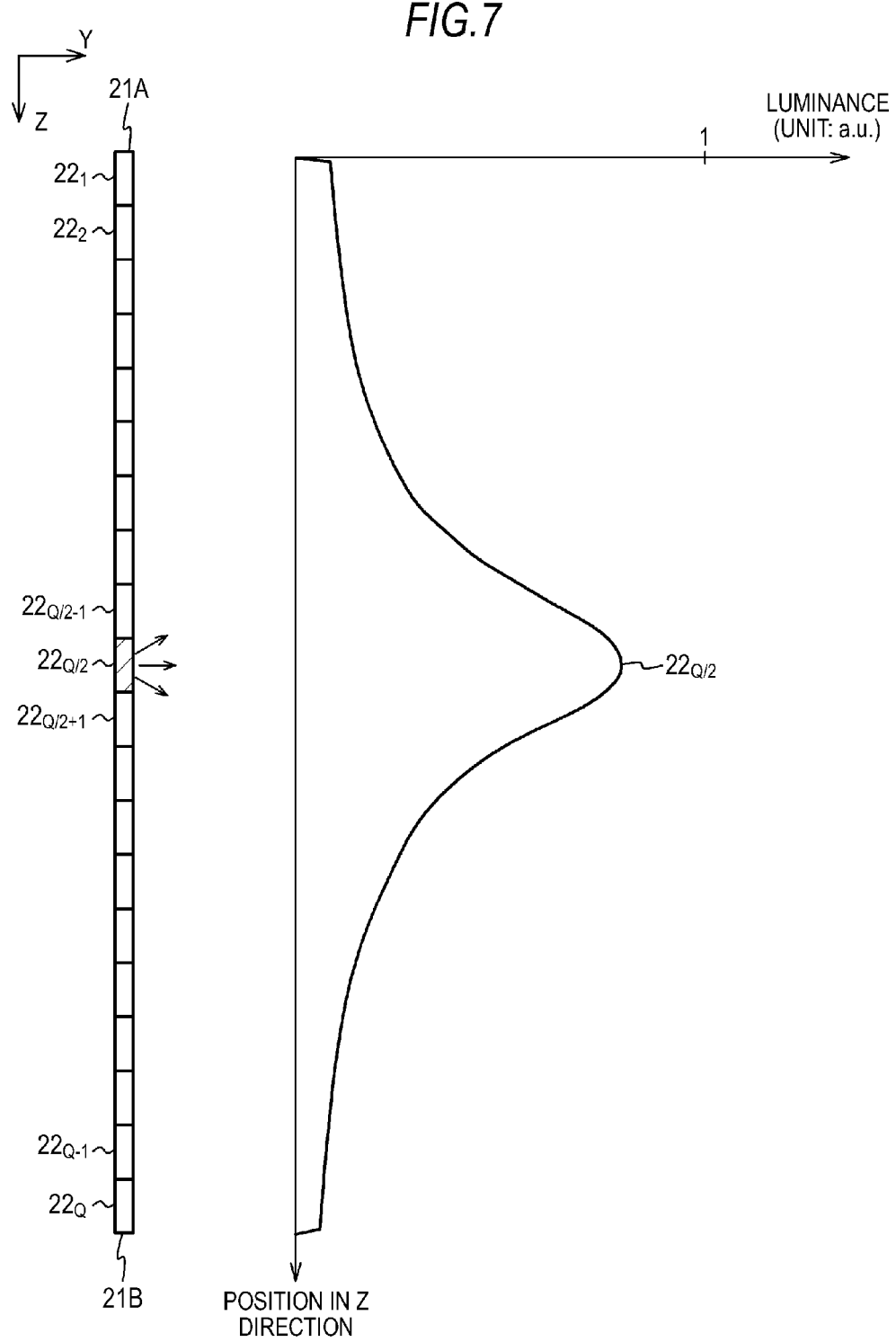
FIG. 7 is a schematic graph illustrating the luminance distribution of the illumination member when a light source corresponding to an illumination unit positioned in the (Q/2)-th row emits light.
Figure 8:
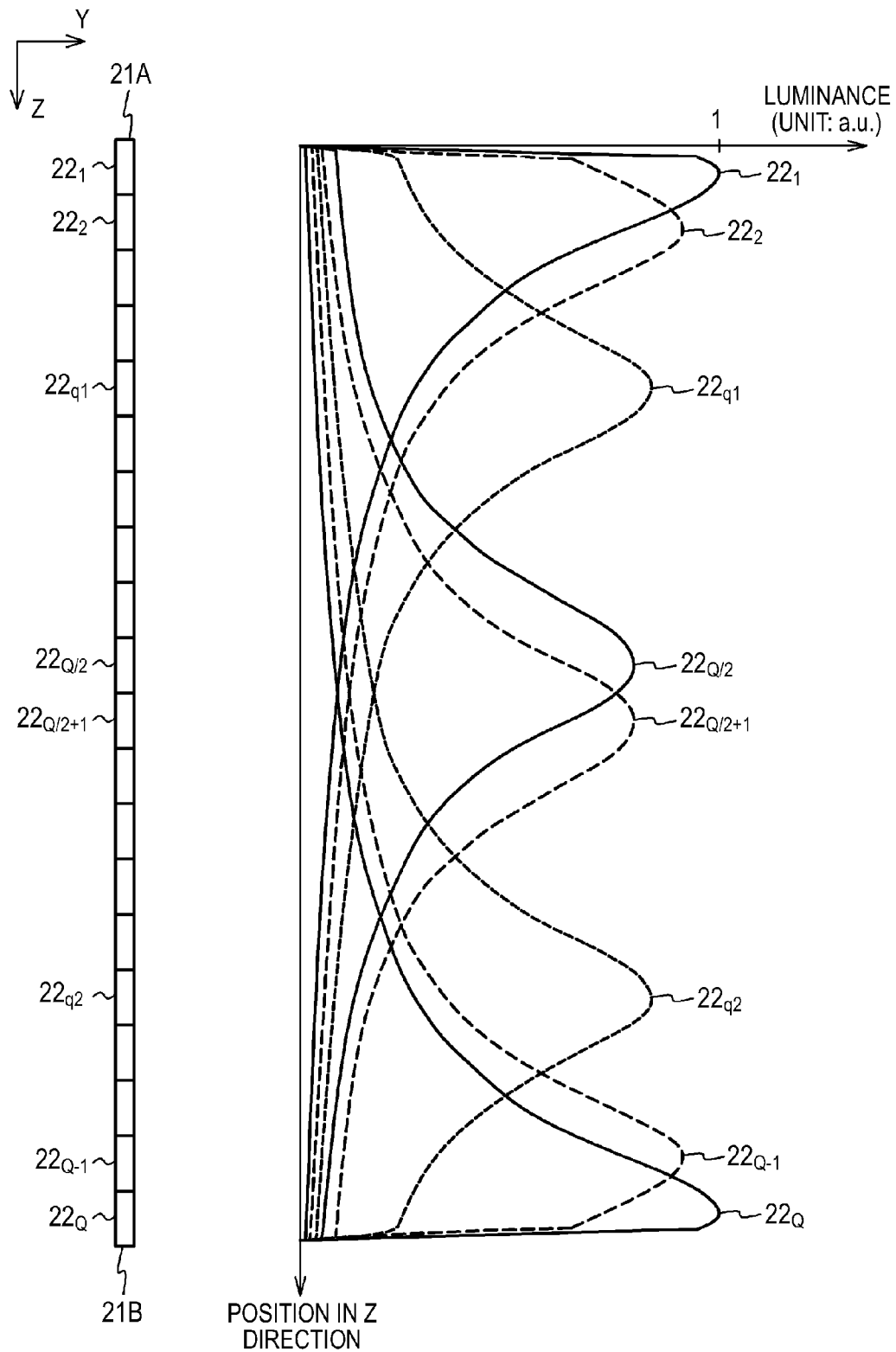
FIG. 8 is a schematic graph illustrating the relation between light emission of a light source corresponding to an illumination unit and the luminance distribution of the illumination member.

FIG. 6 is a schematic graph illustrating the luminance distribution of the illumination member when a light source corresponding to an illumination unit positioned in the first row emits light. FIG. 7 is a schematic graph illustrating the luminance distribution of the illumination member when a light source corresponding to the illumination unit positioned in the (Q/2)-th row emits light. FIG. 8 is a schematic graph illustrating the relation between light emission of the illumination unit and the luminance distribution of the illumination member.

As illustrated in FIG. 6, when the light source 23 corresponding to the illumination unit $22_1$ positioned in the first row emits light, the luminance on the face of the illumination unit $22_1$ is the highest. In addition, the light emitted from the light source of the illumination unit $22_1$ reaches the illumination units $22_2$ to $22_Q$, and the profile of the luminance is represented as the graph illustrated in FIG. 6. The horizontal axis in the graph is in arbitrary units acquired by setting the highest value of the luminance at the time of light emission of the light source 23 corresponding to the illumination unit $22_1$ to one. This applies the same to the other figures.

The profile of the luminance at the time of light emission of the light source 23 corresponding to the illumination unit $22_Q$ positioned in the Q-th row is a profile acquired by inverting the graph illustrated in FIG. 6.

As illustrated in FIG. 7, when the light source 23 corresponding to the illumination unit $22_{Q/2}$ positioned in the (Q/2)-th row emits light, the luminance on the face of the illumination unit $22_{Q/2}$ is the highest. However, since the conditions of the illumination member 20 for the reflection of light and the like inside the casing 24 change, the highest luminance is lower than that illustrated in FIG. 6. Qualitatively, the value of the highest luminance decreases further, as the illumination unit 22 is located closer to the center. The light emitted from the light source of the illumination unit $22_{Q/2}$ reaches the illumination units $22_1$ to $22_{Q/2-1}$ and the illumination units $22_{Q/2+1}$ to $22_Q$, and the profile of the luminance is represented as the graph illustrated in FIG. 7.

Consequently, the relation between the light emission of the light source 23 corresponding to the illumination unit 22 and the luminance distribution of the illumination member 20 is represented as in FIG. 8. In FIG. 8, while the profile of the luminance of each of the illumination units $22_1$, $22_2$, $22_{Q/2}$, $22_{Q/2+1}$, $22_{Q-1}$, and $22_Q$ is illustrated as an example, the profile of the luminance of a certain illumination unit $22_{q1}$ that is arranged between the illumination units $22_2$ and $22_{Q/2}$ and the profile of the luminance of a certain illumination unit $22_{q2}$ that is arranged between the illumination units $22_{Q/2+1}$ and $22_Q$ are also illustrated as an example.

For example, in FIG. 5, the display units $13_1$ and $13_2$ are in the settling period at the time of starting the emission period of the illumination unit $22_k$. On the other hand, the display units $13_3$ to $13_Q$ are in the rewriting period. Accordingly, the display units $13_3$ to $13_Q$ are in the state in which a video signal of the previous frame is written or a state in which a new video signal is in the middle of being rewritten.

Figure 9:
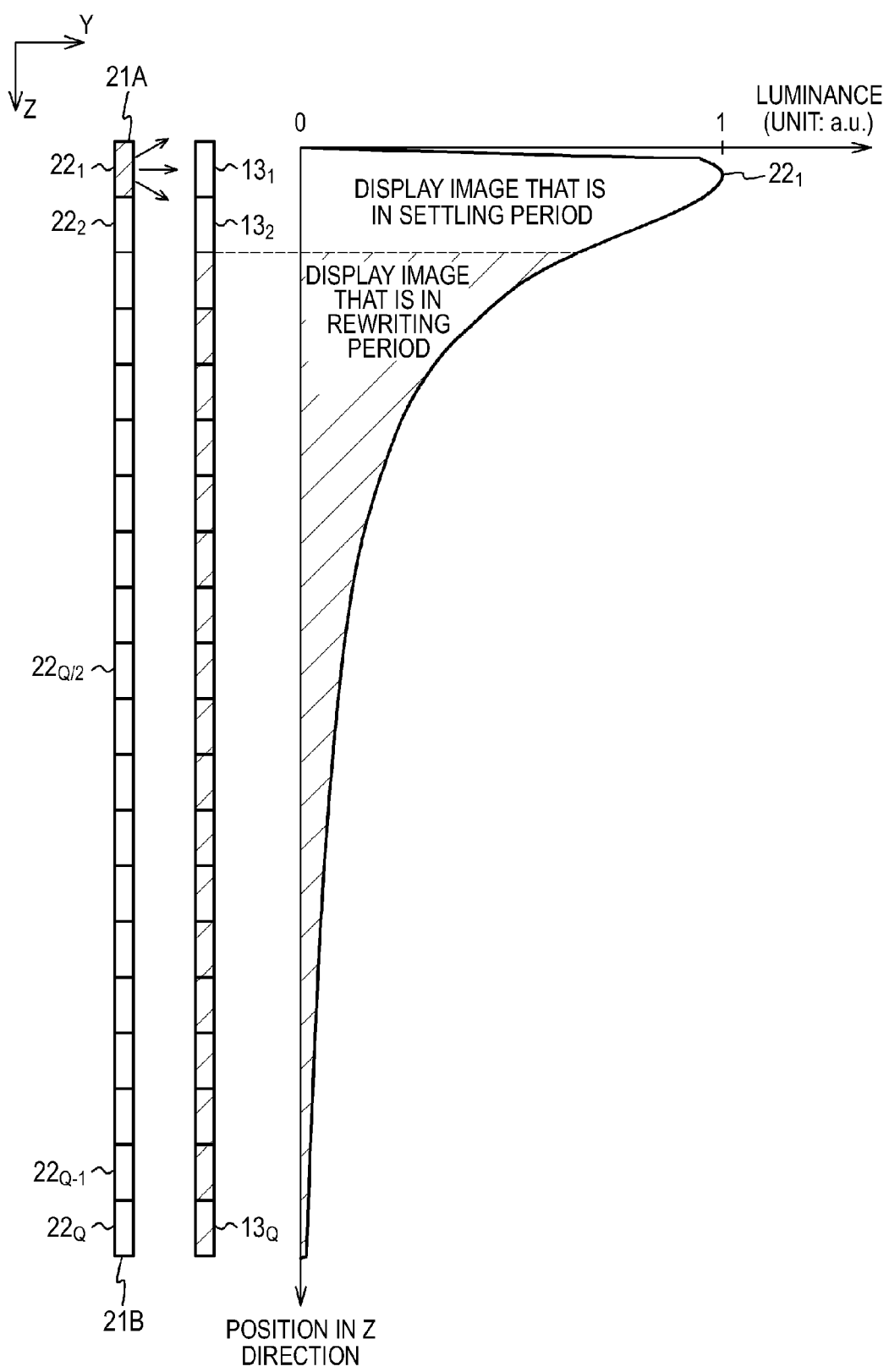
FIG. 9 is a schematic graph illustrating the luminance distribution of the illumination member that emits light to a display unit at the time of starting a light emitting period of the illumination unit positioned in the first row.
Figure 10:
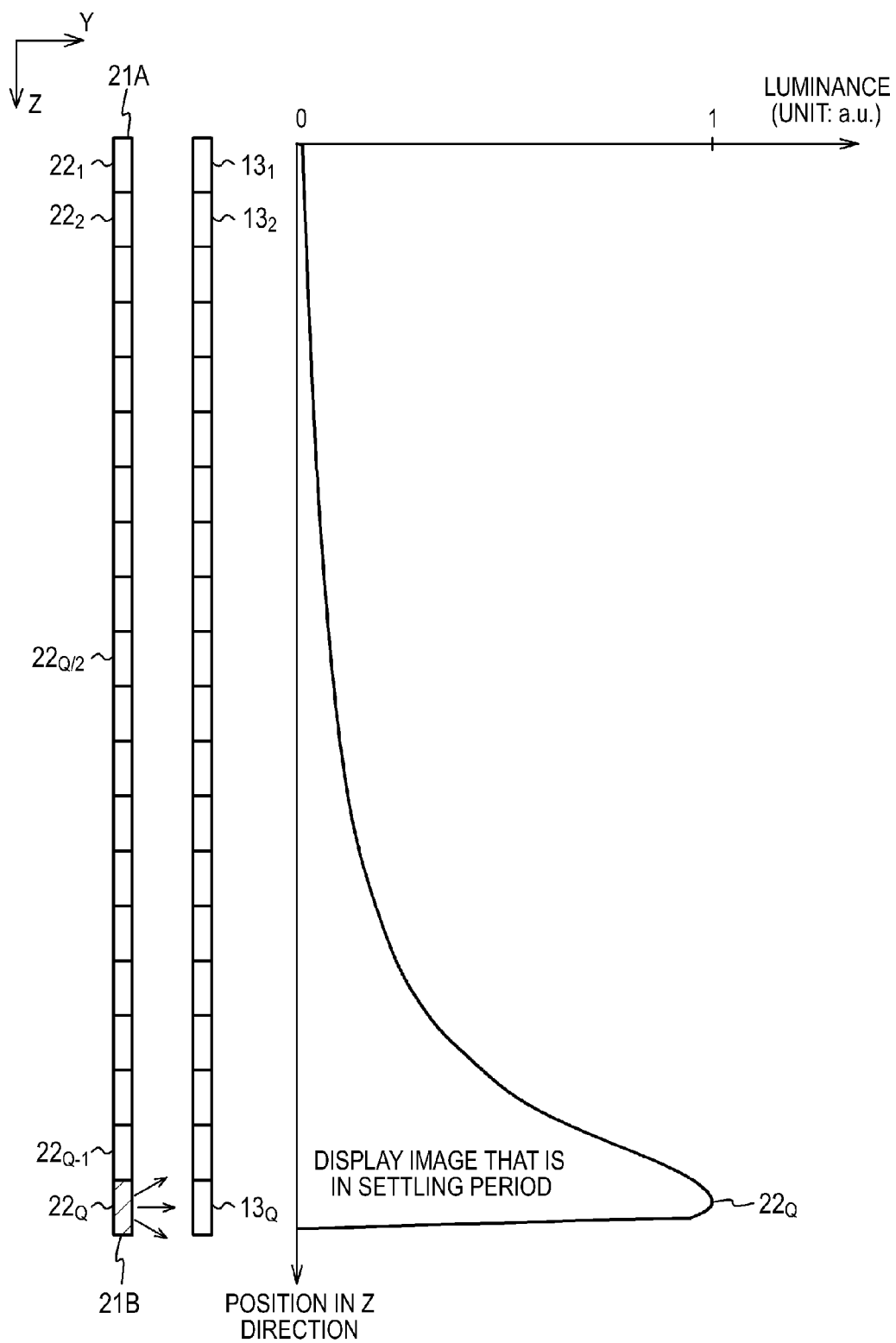
FIG. 10 is a schematic graph illustrating the luminance distribution of the illumination member that emits light to the display unit at the time of starting a light emitting period of an illumination unit positioned in the Q-th row.

FIG. 9 is a schematic graph illustrating the luminance distribution of the illumination member that emits light to the display unit at the time of starting the light emitting period of the illumination unit positioned in the first row. FIG. 10 is a schematic graph illustrating the luminance distribution of the illumination member that emits light to the display unit at the time of starting the light emitting period of the illumination unit positioned in the Q-th row.

As illustrated in FIG. 9, also when the light source 23 corresponding to the illumination unit $22_1$ emits light, the display units $13_3$ to $13_Q$ are irradiated with light having intensity to some degrees. Accordingly, in FIG. 9, a portion of the graph that is applied with diagonal lines represents an image during the rewriting period, therefore, the separation characteristics of the images are degraded.

On the other hand, at the time of starting the light emitting period of the illumination unit $22_Q$ illustrated in FIG. 5, all the display units $13_1$ to $13_Q$ are in the settling period. Accordingly, as illustrated in FIG. 10, a phenomenon does not occur in which an image during the rewriting period is displayed in accordance with light emitted from the illumination member 20.

As described above, in the operation according to the reference example, a phenomenon occurs in which an image during a rewriting period is displayed even though the illumination unit is scanned. According to the first embodiment, the degree in which an image during a rewriting period is displayed can be decreased. Hereinafter, the operation according to the first embodiment will be described with reference to FIGS. 11 to 13.

Figure 11:
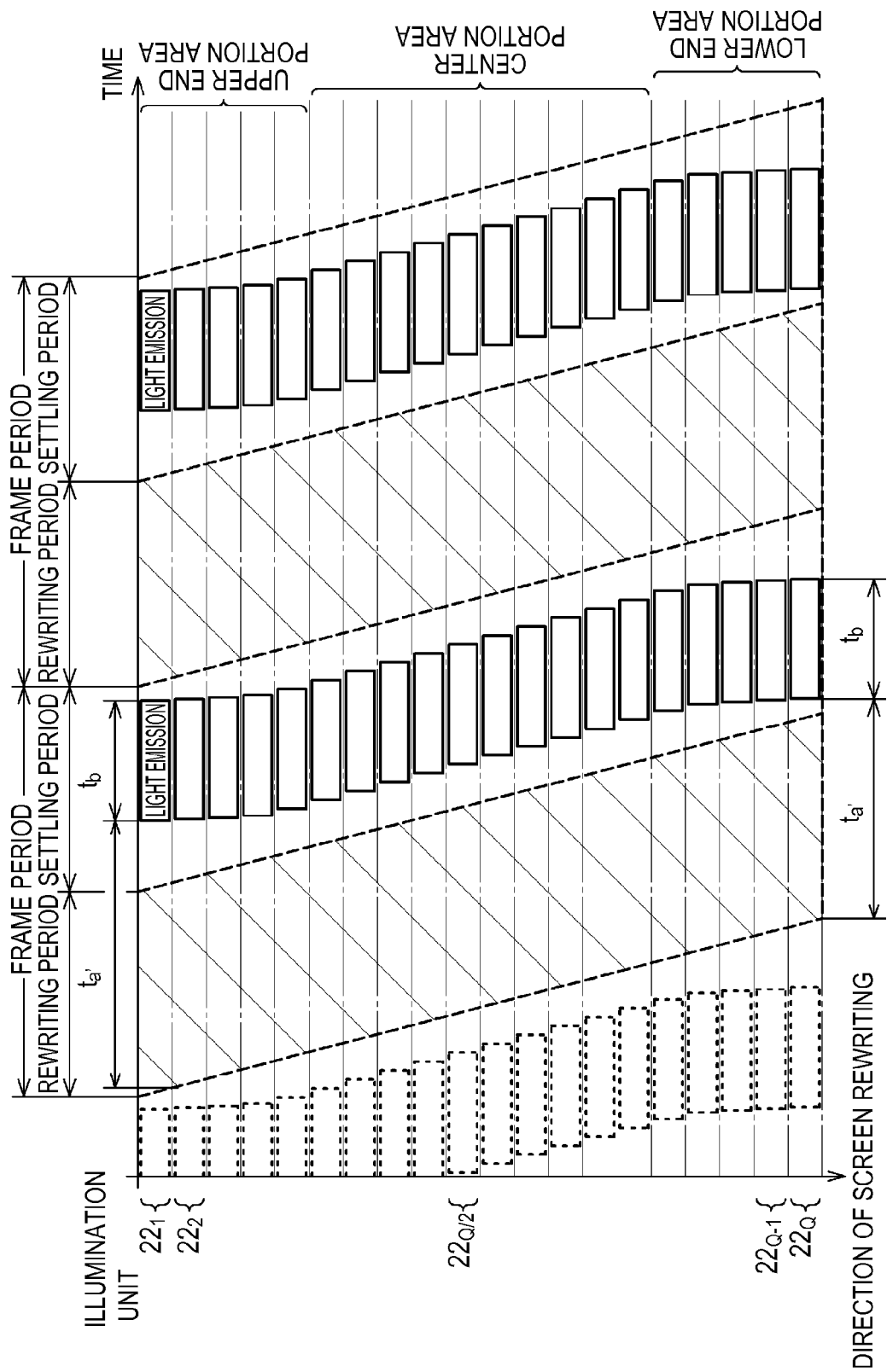
FIG. 11 is a schematic diagram illustrating the scanning of the illumination member according to the first embodiment.

FIG. 11 is a schematic diagram illustrating the scanning of the illumination member according to the first embodiment. FIG. 12A is a schematic graph illustrating the relation between the scanning of the illumination member according to the reference example and a waiting time. FIG. 12B is a schematic graph illustrating the relation between the scanning of the illumination member according to the first embodiment and a waiting time.

According to the first embodiment, in an area (an upper end portion area) located on one end portion 21A side and an area (a lower end portion) located on the other end portion 21B side, a waiting time $t_a'$ is set so as to be non-linearly decreased in accordance with the scanning sequence of the illumination unit 22.

In the reference example, as illustrated in FIG. 12A, the length of the waiting time $t_a$ is constant. In contrast to this, according to the first embodiment, as illustrated in FIG. 12B, the length of the waiting time $t_a'$ is set so as to be the largest in the illumination unit $22_1$ positioned in the first row. In addition, in the upper end portion area and the lower end portion area, the waiting time is set so as to be nonlinearly decreased in accordance with the scanning sequence of the illumination unit 22. Here, although the waiting time is constant in the upper end portion area, the lower end portion area, and the center portion area, the present disclosure is not limited thereto.

As described above, since the waiting time is set to be nonlinearly decreased, a period from when the illumination unit 22 positioned on one end portion 21A side is in the light emitting state to when the illumination unit 22 positioned on the other end portion 21B side is in the light emitting state is shorter than the period from the start to the end of the sequential scanning in the display area.

Figure 13:
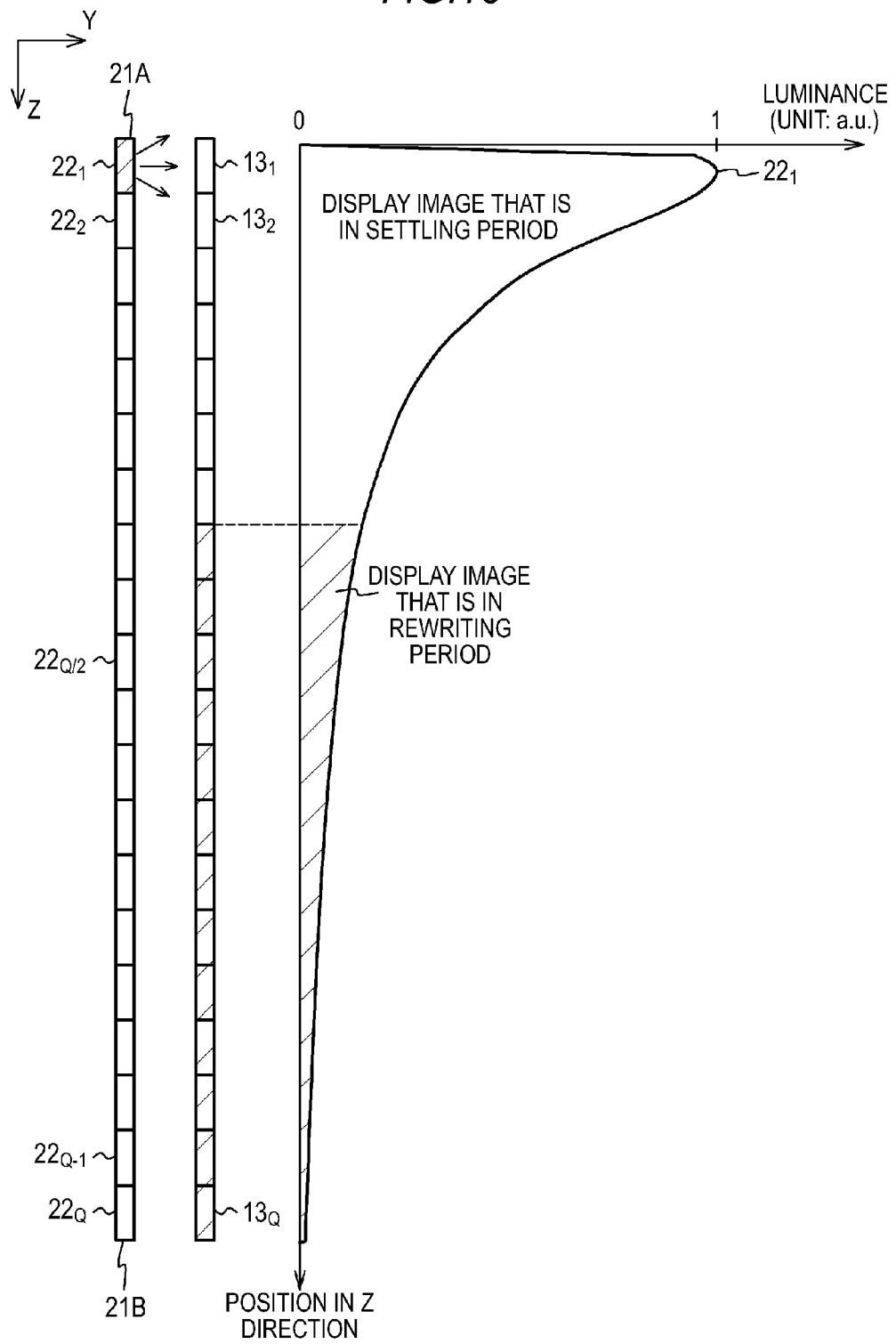
FIG. 13 is a schematic graph illustrating the luminance distribution of the illumination member that emits light to the display unit at the time of starting a light emitting period of the illumination unit positioned in the first row according to the first embodiment.

FIG. 13 is a schematic graph illustrating the luminance distribution of the illumination member that emits light to the display unit at the time of starting a light emitting period of the illumination unit positioned in the first row according to the first embodiment.

For example, in a case where a time when the light emitting period of the illumination unit $22_1$ positioned in the first row is started is considered, in the first embodiment, a state is formed in which the scanning of the display units 13 advances more than that of the reference example. Accordingly, as illustrated in FIG. 13, the degree of displaying an image during the rewriting period is lower than that illustrated in FIG. 9. This is similar in the other illumination units 22 located in the upper end portion area.

By setting as such, the length of the waiting time of the illumination unit 22 located in the upper end portion area can be secured sufficiently, compared with that of the reference example.

In addition, the waiting time may be configured to be nonlinearly decreased only in the upper end portion area, or/and the waiting time may be configured to be nonlinearly decreased only in the lower end portion area.

The image separation characteristics of the display device 1 are suppressed from being degraded. Accordingly, by alternately displaying an image for the left eye and an image for the right eye in the display device 1, and by switching a so-called glass-type optical shutter in accordance with the display, a stereoscopic image having excellent image quality can be displayed.

Figure 14:
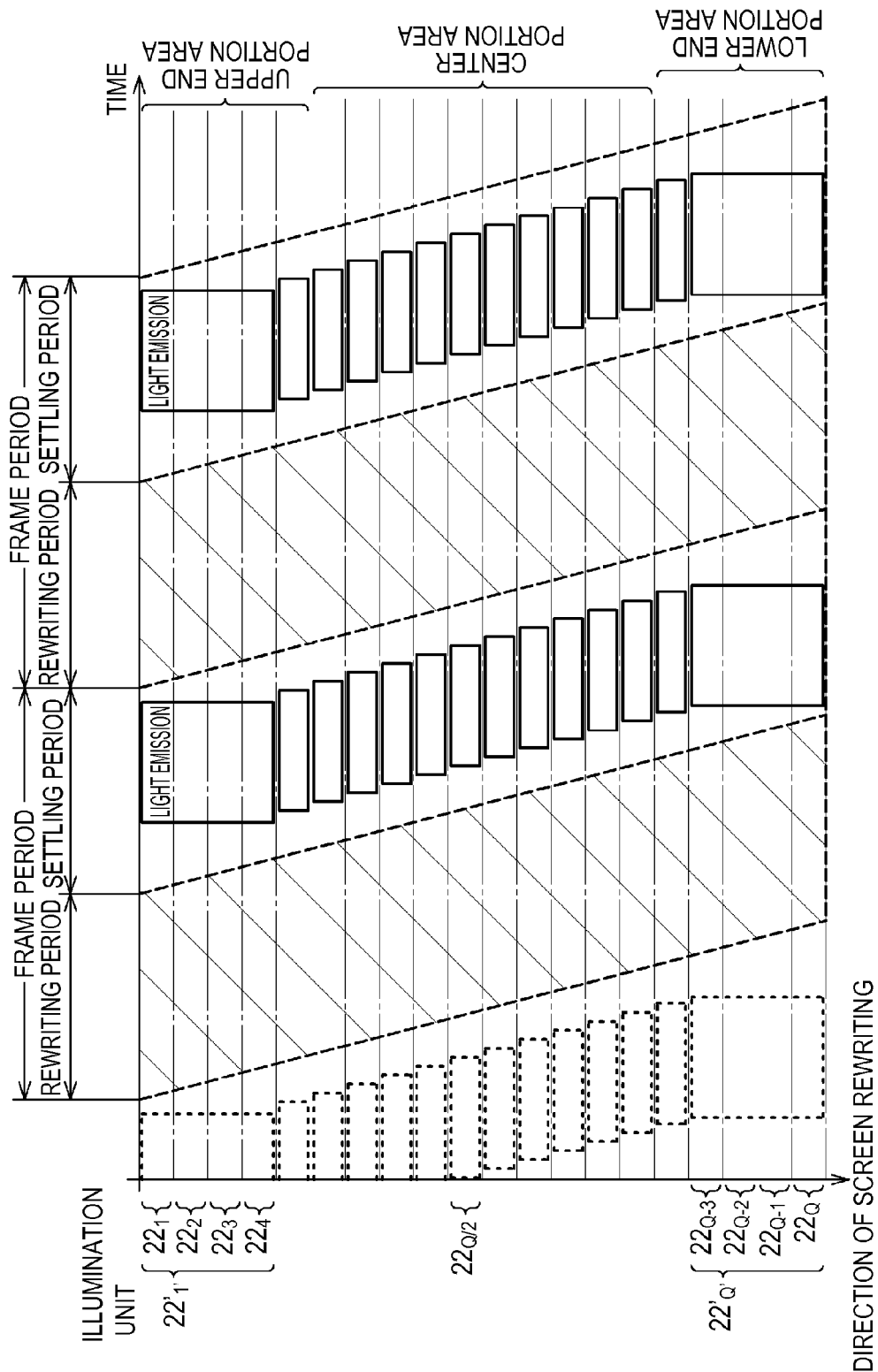
FIG. 14 is a schematic diagram illustrating the scanning of an illumination member according to a modified example of the first embodiment.
Figure 15:
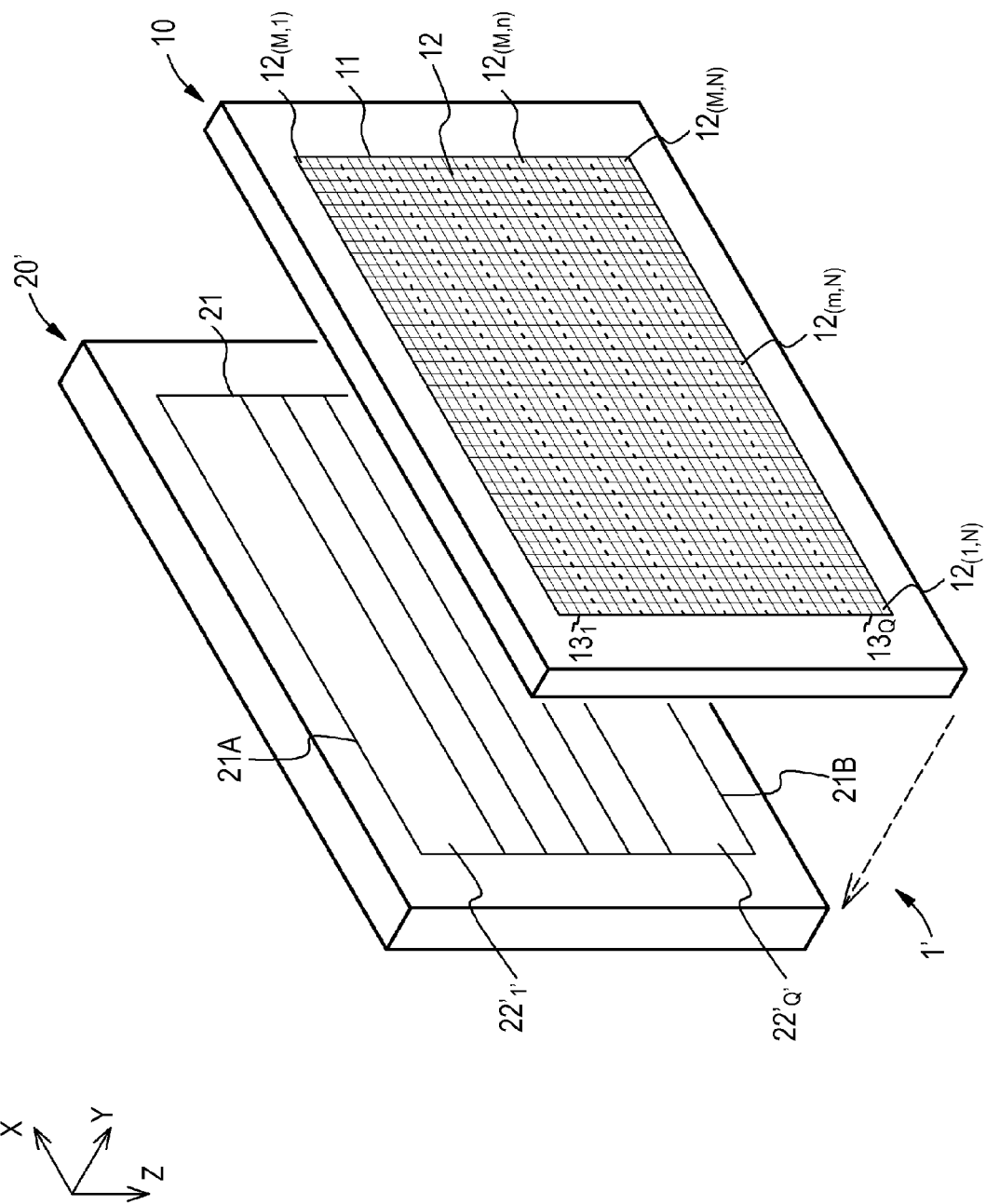
FIG. 15 is a conceptual diagram of a display device according to the modified example of the first embodiment.

In addition, in the description presented above, although all the planar shapes of the illumination units are configured to be the same, for example, a configuration may be employed in which the planar shapes of the illumination units arranged at the upper end and the lower end are enlarged. A schematic diagram illustrating the scanning of an illumination member according to a modified example of the first embodiment is illustrated in FIG. 14. In addition, a conceptual diagram of a display device 1' according to the modified example of the first embodiment is illustrated in FIG. 15. In the example illustrated in FIGS. 14 and 15, an illumination member 20' is used in which illumination units 22 corresponding to four rows at the upper end and the lower end are replaced with an illumination unit 22'.

Second Embodiment

A second embodiment is a modified example of the first embodiment. The second embodiment is different from the first embodiment in that the light emitting period of an illumination unit arranged in an area located on the end portion side is set to be shortened as the illumination unit is located closer to the end portion side.

A schematic perspective view of a display device 2 according to the second embodiment is similar to that acquired by replacing the display device 1 illustrated in FIG. 1 with the display device 2. In addition, a conceptual diagram of the display device according to the second embodiment is similar to that acquired by replacing the display device 1 illustrated in FIG. 3 with the display device 2 and is similar to that acquired by replacing the illumination member driving circuit 103 with an illumination member driving circuit 203. The illumination member driving circuit 203 drives an illumination unit 22 arranged in an area located on the one end portion side such that the illumination period is further shortened as the illumination unit 22 is located closer to the end portion side.

As illustrated in FIG. 8 that has been referred to in the first embodiment, the luminance of the illumination member 20 tends to be higher toward an end portion 21A in the area of one end portion 21A side. Similarly, in the area located on the other end portion 21B side, the luminance tends to be higher toward an end portion 21B in the area located on the end portion 21B side. Accordingly, when the illumination unit 22 is scanned, it is visually recognized that the luminance becomes higher toward the end portion from the center portion.

Accordingly, in the second embodiment, the illumination member driving circuit 203 drives the illumination units 22 arranged in the area located on the end portion side such that the light emitting period of an illumination unit 22 is set to be shortened as the illumination unit is located closer to the end portion side.

Figure 16:
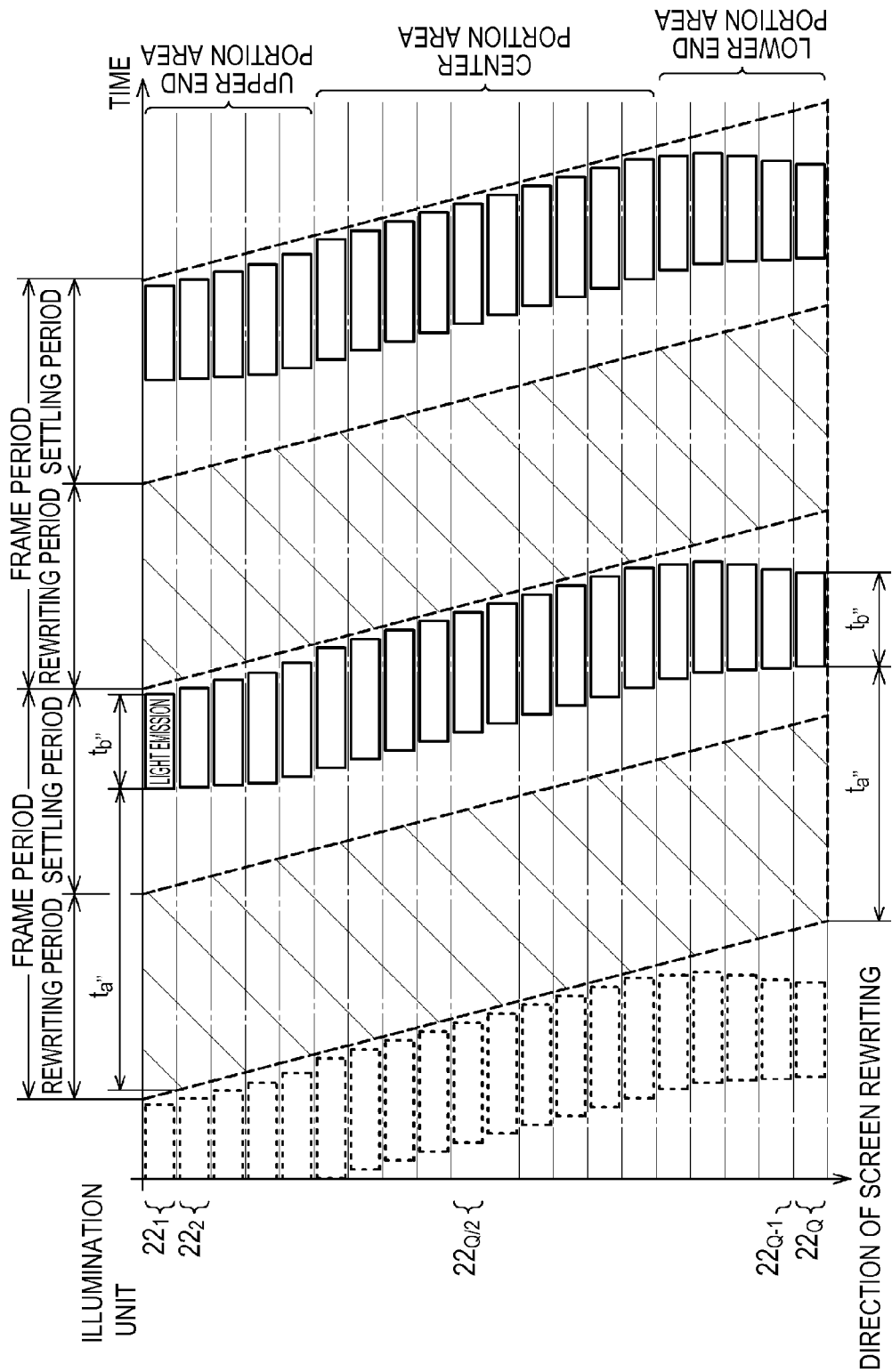
FIG. 16 is a schematic diagram illustrating the scanning of an illumination member according to a second embodiment.

FIG. 16 is a schematic diagram illustrating the scanning of the illumination member according to the second embodiment. FIG. 17A is a schematic diagram illustrating the light emitting period of the illumination member according to the first embodiment. FIG. 17B is a schematic graph illustrating the light emitting period of the illumination member according to the second embodiment.

Since the light emitting period of an illumination unit 22 is set to be shorter as the illumination unit 22 is located closer to the end portion side, the value of a waiting time $t_a''$ in the upper end portion illustrated in FIG. 16 can be set to be longer than the waiting time $t_a'$ described in the first embodiment. According to the second embodiment, the length $t_b''$ of the light emitting period is shorter toward the end portion 21A on the side of the upper end portion and is shortened toward the end portion 21B on the side of the lower end portion area.

As illustrated in FIG. 17A, according to the first embodiment, the length of the light emitting period $t_b$ of the illumination unit 22 is constant regardless of the scanning sequence. In contrast to this, according to the second embodiment, as illustrated by a curve 1 shown in FIG. 17B, the light emitting period $t_b''$ is shortened toward the end portion.

Accordingly, the trend in which the luminance is visually recognized to be higher toward the end portion from the center portion is compensated, whereby the uniformity of the luminance in the displayed image can be improved. In addition, since the value of the waiting time $t_a''$ in the upper end portion area can be set to be longer than that of the first embodiment, the image separation characteristics can be further improved.

Third Embodiment

A third embodiment is a modified example of the first embodiment. There is a difference that an optical splitting unit is further included which is used for splitting an image displayed on a display unit into images of a plurality of viewpoints.

FIG. 18 is a schematic perspective view of a display device according to the third embodiment when it is virtually divided.

As illustrated in FIG. 18, the display device 3 according to the third embodiment includes a transmission-type display member 10 including a display area 11 that is sequentially scanned and an illumination member 20 that is arranged on the rear face of the display member 10 and includes a plurality of illumination units 22 that are arranged so as to be aligned in a direction from one end portion side 21A toward the other end portion side 21B along a direction in which the display area 11 is sequentially scanned. In addition, the optical splitting unit 30 is further included which is used for splitting an image displayed on the display member 10 into a plurality of viewpoint images.

The configurations and the operations of the display member 10 and the illumination member 20 are basically similar to those described in the first embodiment, and thus the description thereof will not be presented.

Although the number of viewpoints of the image in the third embodiment will be described as four viewpoints $A_1$, $A_2$, $A_3$, and $A_4$ in each one of observation areas $WA_L$, $WA_C$, and $WA_R$ illustrated in FIG. 18, this is merely an example. The number of the observation areas and the number of viewpoints may be appropriately set based on the design of the display device 3. When a distance between the viewpoints is set to about 65 [mm], and a parallax image at each viewpoint is set to be observed, an image observer recognizes the displayed images as a stereoscopic image.

Figure 19:
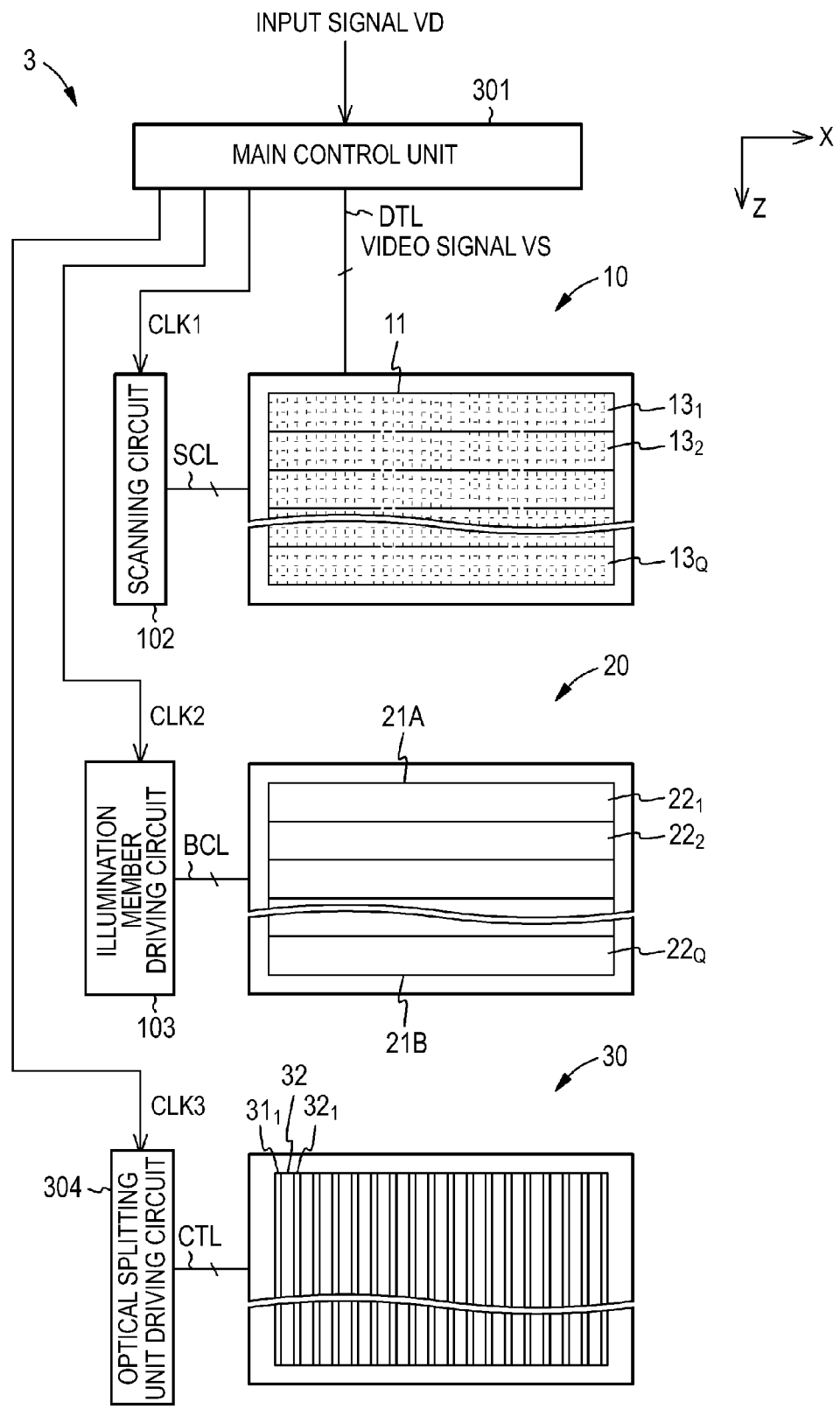
FIG. 19 is a conceptual diagram of the display device according to the third embodiment.

FIG. 19 is a conceptual diagram of the display device according to the third embodiment.

An optical splitting unit driving circuit 304 is operated based on a clock signal CLK3 supplied from the main control unit 301 and appropriately changes the states of first opening/closing portion 31, second opening/closing portion 32, and third opening/closing portion 33 to be described later. Accordingly, the image displayed on the display member 10 is split into images of each viewpoint. The other configurations are similar to those of the first embodiment illustrated in FIG. 3, and thus the description thereof will not be presented.

As illustrated in FIG. 18, the optical splitting unit 30 extends in the vertical direction (the Z direction in the figure) and includes a plurality of the first opening/closing portions 31, the second opening/closing portions 32, and the third opening/closing portions 33 that are arranged so as to be aligned in the horizontal direction (the X direction in the figure). The first opening/closing portion 31 and the second opening/closing portion 32 are alternately arranged with the third opening/closing portion 33 interposed therebetween in the horizontal direction. A barrier forming area 34 is configured by a plurality of the first opening/closing portions 31, the second opening/closing portions 32, and the third opening/closing portions 33 aligned in the horizontal direction. In the third embodiment, P first opening/closing portions 31 are arranged, and (P−1) second opening/closing portions 32 are arranged. In the third embodiment, the number of the third opening/closing portions 33 is the same as that of the second opening/closing portions 32. The p-th (here, p=1, 2, . . . , P) first opening/closing portion 31 is denoted by $31_p$. This is similar for the second opening/closing portions 32. All the first opening/closing portion 31, the second opening/closing portion 32, and the third opening/closing portion 33 may be represented as the opening/closing portions 31, 32, and 33. The relation between "P" and "M" will be described later with reference to FIG. 21.

Figure 20:
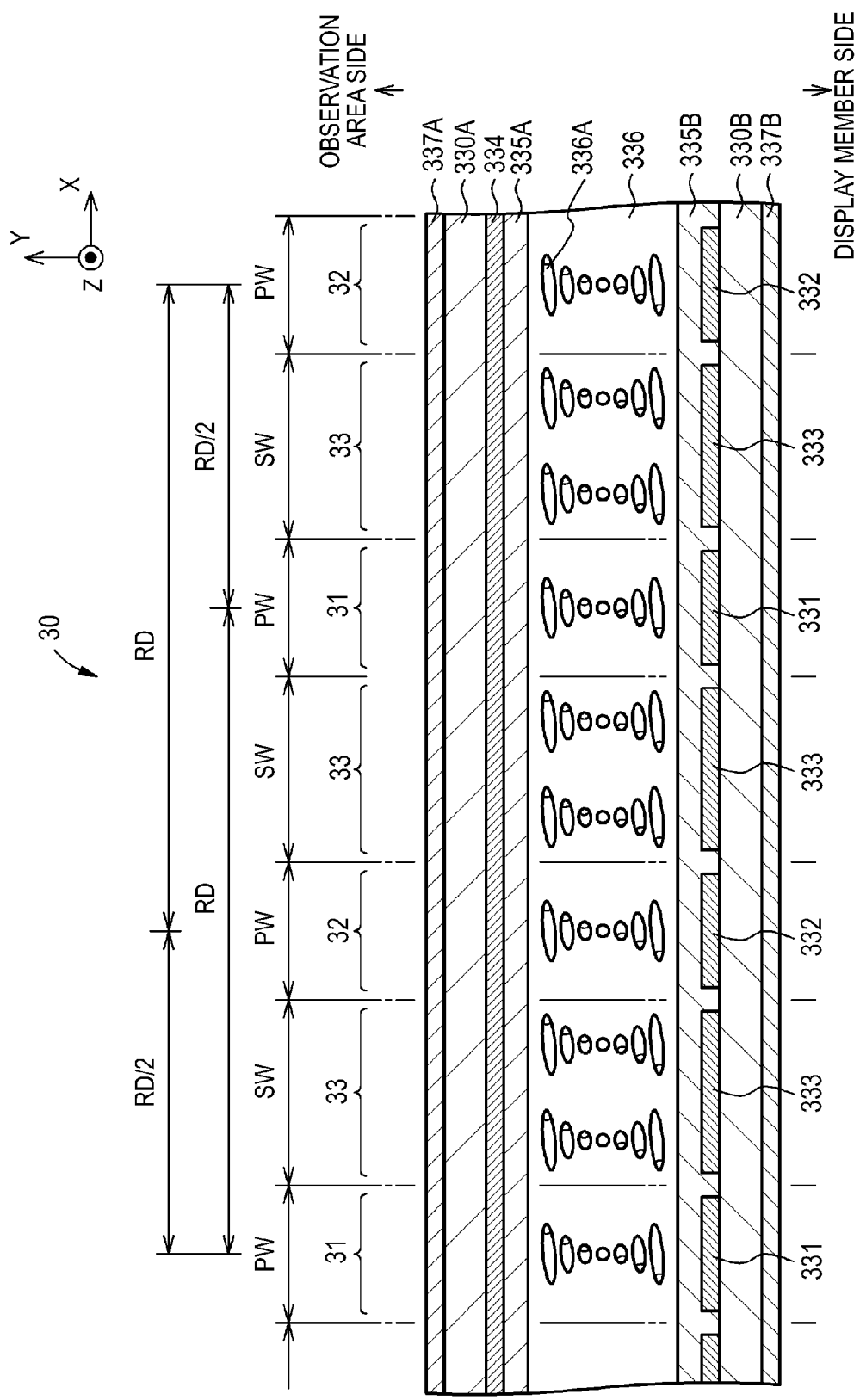
FIG. 20 is a partial cross-sectional view acquired when an optical splitting unit is cut off along a virtual plane parallel to the X-Y plane.

FIG. 20 is a partial cross-sectional view acquired when the optical splitting unit is cut off along a virtual plane parallel to the X-Y plane.

In FIG. 20, a reference sign PW represents the width of the first opening/closing portion 31 or the second opening/closing portion 32 in the horizontal direction (the X direction in the figure), and a reference sign SW represents the width of the third opening/closing portion 33 in the horizontal direction. A pitch between the first opening/closing portions 31 and 31 adjacent to each other in the horizontal direction and a pitch between the second opening/closing portions 32 and 32 adjacent to each other in the horizontal direction are the same and are represented by a reference sign RD. A pitch between the first opening/closing portion 31 and the second opening/closing portion 32 in the horizontal direction is RD/2.

The optical splitting unit 30, for example, includes one pair of light-transmitting substrates 330A and 330B that are formed from glass substrates and a liquid crystal material layer 336 arranged between the substrates 330A and 330B and includes a plurality of the opening/closing portions 31, 32, and 33 that can be switched between a light transmitting state and a light shielding state. The optical splitting unit 30 splits an image displayed on the display member 10 by setting predetermined opening/closing portions to be in a light transmitting state and the other opening/closing portions to be in a light shielding state.

More particularly, on the liquid crystal material layer 336 side of the substrate 330A, a transparent common electrode 334, for example, formed from ITO is formed on the whole face, and an orientation film 335A, for example, formed from polyimide is formed thereon. In addition, on the liquid crystal material layer 336 side of the substrate 330B, a first transparent electrode 331, a second transparent electrode 332, and a third transparent electrode 333, which are formed from ITO, for example and formed in correspondence with the opening/closing portions 31 and 32, and 33, are formed. All the first transparent electrode 331, the second transparent electrode 332, and the third transparent electrode 333 may be collectively represented as transparent electrodes 331, 332, and 333.

The planar shape of the transparent electrodes 331, 332, and 333 is an approximate stripe shape. On the substrate 330B including areas on the transparent electrodes 331, 332, and 333, an orientation film 335B, for example, formed from polyimide is formed. Furthermore, the transparent common electrode 334 and the transparent electrodes 331, 332, and 333 may be configured to be replaced with each other.

An orientation process is performed for the face of the first orientation film 335A that is located on the liquid crystal material layer 336 side, for example, in a direction forming 335 degrees with respect to the X axis on the X-Z plane by using a known method such as a rubbing process. On the other hand, an orientation process is performed for the face of the second orientation film 335B that is located on the liquid crystal material layer 336 side in a direction forming 45 degrees with respect to the X axis on the X-Z plane.

FIG. 20 illustrates a state in a case where any electric field is not generated between the transparent common electrode 334 and the transparent electrodes 331, 332, and 333. In this state, the direction (also referred to as a "director") of the molecular axis of liquid crystal molecules 336A that configure the liquid crystal material layer 336 forms about 335 degrees with respect to the X axis on the X-Z plane on the substrate 330A side. Then, the direction of the molecular axis gradually changes and forms about 45 degrees with respect to the X axis on the X-Z plane on the substrate 330B side. The liquid crystal material layer 336 is operated in a so-called TN (twisted nematic) mode.

For the convenience of the description, the polarizing axis of light emitted from the display member 10 is assumed to form 45 degrees with respect to the X axis on the X-Z plane according to a polarizing film, which is not illustrated in the figure, stacked on the surface of the display member 10. On the face of the substrate 330B that is located on the display member 10 side, a polarizing film 337B is stacked, and, on the face of the substrate 330A that is located on the observation area side, a polarizing film 337A is stacked. The polarizing film 337B is stacked such that the polarizing axis forms 45 degrees with respect to the X axis on the X-Z plane, and the polarizing film 337A is stacked such that the polarizing axis forms 335 degrees with respect to the X axis on the X-Z plane. The polarizing films 337A and 337B are arranged to be in a state in which the polarizing axes thereof are perpendicular to each other (cross Nichol). In addition, a polarizing film, which is not illustrated in the figure, stacked on the surface of the display member 10 and the polarizing film 337B may be configured to be commonly shared.

All the first transparent electrodes 331 are electrically connected through wirings not illustrated in the figure. Similarly, all second transparent electrodes 332 are electrically connected through wirings not illustrated in the figure, and all third transparent electrodes 333 are electrically connected through wirings not illustrated in the figure.

A constant voltage (for example, 0 volts) is applied to the transparent common electrode 334, and independent voltages are applied to the first transparent electrode 331, the second transparent electrode 332, the third transparent electrode 333 based on the operation of the optical splitting unit driving circuit 304.

An operation performed in a case where any electric field is not generated between the transparent common electrode 334 and the transparent electrodes 331, 332, and 333, in other words, an operation performed when voltages having the same value are applied to the transparent common electrode 334 and the transparent electrodes 331, 332, and 333 will be described. In such a case, light incident to the liquid crystal material layer 336 through the polarizing film 337B has the polarizing direction to be changed by 90 degrees by the liquid crystal molecules 336A and is transmitted through the polarizing film 337A. Accordingly, the optical splitting unit 30 is operated in a so-called normally-white mode.

In a case where a fixed optical splitting unit is used, as will be described later, "the resolution/the number of viewpoints of the display member" is the resolution of a stereoscopic image, and accordingly, the resolution of the stereoscopic image is decreased. According to the third embodiment, by using a dynamic optical splitting unit, the decrease in the resolution of the stereoscopic image can be alleviated.

In particular, in order to display one stereoscopic image, two images (a first field image and a second field image) are displayed on the display member 10. Then, based on the operations of the main control unit 301 and the optical splitting unit driving circuit 304, only the first opening/closing portion 31 is configured to be in the light transmitting state when the first field image is displayed, and only the second opening/closing portion 32 is configured to be in the light transmitting state when the second field image is displayed. By forming all the opening/closing portions 31, 32, and 33 to be in the light transmitting state, an ordinary image can be displayed as well.

Figure 21:
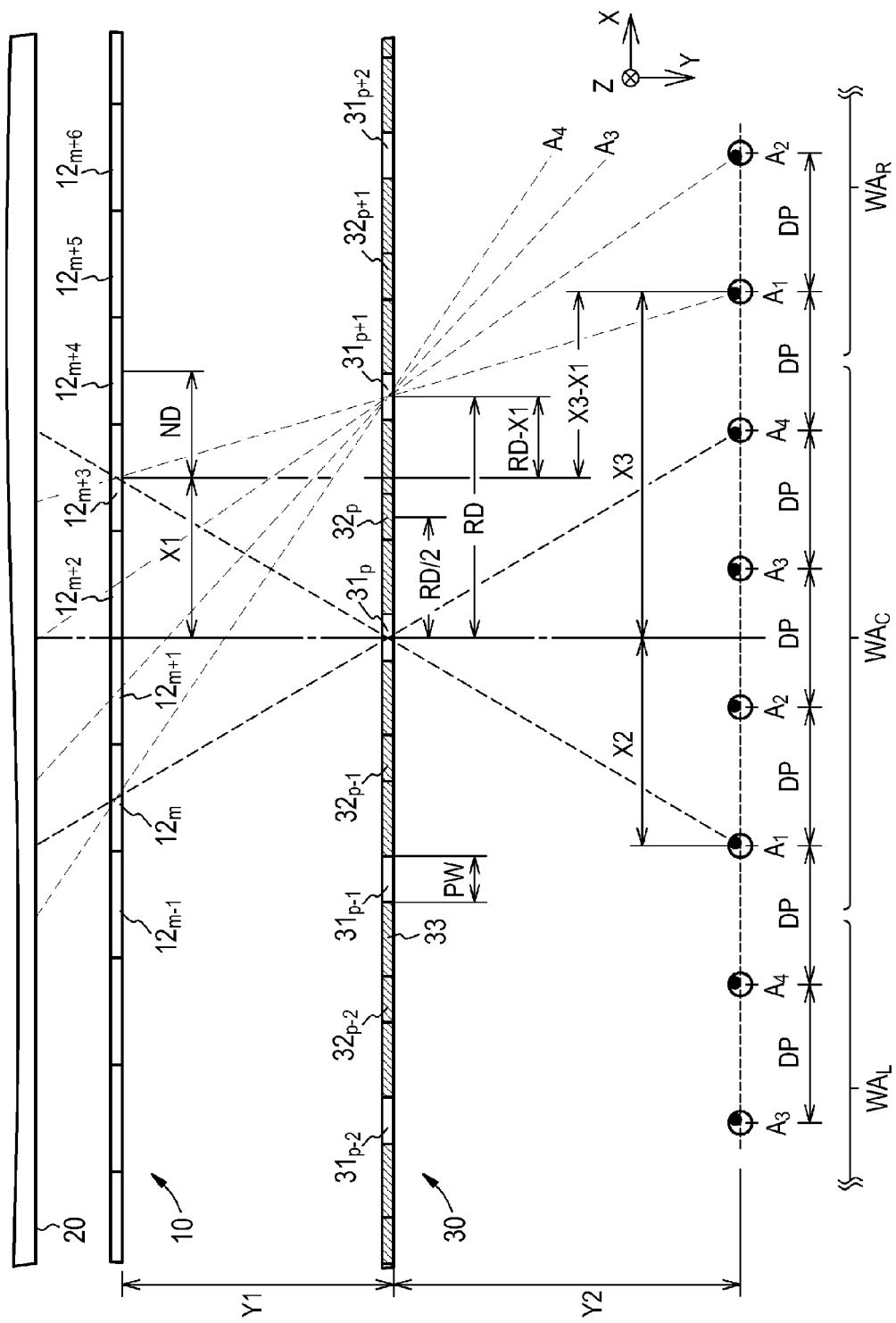
FIG. 21 is a schematic diagram illustrating the conditions to be satisfied for allowing light of a pixel that is transmitted through a first opening/closing portion to travel toward viewpoints $A_1$ to $A_4$ located in an observation area.

FIG. 21 is a schematic diagram illustrating the conditions to be satisfied for allowing light of a pixel that is transmitted through the first opening/closing portion to travel toward viewpoints $A_1$ to $A_4$ located in the observation area.

For convenience of the description, it is assumed that a boundary of the (m+1)-th pixel $12_{m+1}$ and the (m+2)-th pixel $12_{m+2}$ and a center point between the viewpoints $A_2$ and $A_3$ in the observation area $WA_C$ are positioned on a virtual straight line that passes through the center of the first opening/closing portion $31_p$ and extends in the Y direction. Here, a pixel pitch is denoted by ND [mm] In addition, a distance between the display member 10 and the optical splitting unit 30 is denoted by Y1 [mm], and a distance between the optical splitting unit 30 and the observation areas $WA_L$, $WA_C$, and $WA_R$ is denoted by Y2 [mm] Furthermore, a distance between viewpoints adjacent to each other in the observation areas $WA_L$, $WA_C$, and $WA_R$ is denoted by DP [mm] In addition, as described above, the pitch of the first opening/closing portion 31 in the horizontal direction and the pitch of the second opening/closing portion 32 in the horizontal direction are denoted by RD [mm].

In FIG. 21, the first opening/closing portion 31 is in the light transmitting state, and the second opening/closing portion 32 and the third opening/closing portion 33 are in the light shielding state. In addition, in order to clearly represent the light transmitting state and the light shielding state, diagonal lines are applied to the opening/closing portions that are in the light shielding state. This is applied similarly to other figures to be described later.

For convenience of the description, it is assumed that the width PW of the first opening/closing portion 31 and the second opening/closing portion 32 is sufficiently small, and the description will be presented with focusing on the orbit of light passing through the center of the first opening/closing portion 31.

While a virtual straight line that passes through the center of the first opening/closing portion $31_p$ and extends in the Y direction is used as a reference, a distance up to the center of the pixel $12_{m+3}$ is denoted by X1, a distance up to the viewpoint $A_1$ of the observation area $WA_C$ located at the center is denoted by X2, and a distance up to the viewpoint $A_1$ of the observation area $WA_R$ located on the right side is denoted by X3. When light emitted from the pixel $12_{m+3}$ is transmitted through the first opening/closing portion $31_p$ and travels toward the viewpoint $A_1$ of the observation area $WA_C$ located at the center, based on the geometric similarity relation, the condition represented in the following Equation (1) is satisfied.

$$Y1:X1=Y2:X2 \qquad (1)$$

Here, X1=1.5×ND and X2=1.5×DP, and accordingly, when these are reflected, Equation (1) is represented as in the following Equation (1').

$$Y1:1.5\times ND=Y2:1.5\times DP \qquad (1')$$

When the above-described Equation (1') is satisfied, it is geometrically apparent that light emitted from the pixels $12_{m+2}$, $12_{m+1}$, and $12_m$ travels toward the viewpoints $A_2$, $A_3$, and $A_4$ of the observation area $WA_C$.

In addition, when light emitted from the pixel $12_{m+3}$ is transmitted through the first opening/closing portion $31_{p+1}$ and travels toward the viewpoint $A_1$ of the observation area $WA_R$, based on the geometric similarity relation, the condition represented in the following Equation (2) is satisfied.

$$Y1:(RD-X1)=(Y1+Y2):X3-X1 \qquad (2)$$

Here, X1=1.5×ND and X3=2.5×DP, and accordingly, when these are reflected, Equation (2) is represented as in the following Equation (2').

$$Y1:(RD-1.5\times ND)=(Y1+Y2):(2.5\times DP-1.5\times ND) \qquad (2')$$

When the above-described Equation (2') is satisfied, it is geometrically apparent that light emitted from the pixels $12_{m+2}$, $12_{m+1}$, and $12_m$ travels toward the viewpoints $A_2$, $A_3$, and $A_4$ of the observation area $WA_R$.

In addition, the condition that light emitted from the pixels $12_{m+3}$, $12_{m+2}$, $12_{m+1}$, and $12_m$ passes through the first opening/closing portion $31_{p-1}$ and travels toward the viewpoints $A_1$, $A_2$, $A_3$, and $A_4$ of the observation area $WA_L$ that is located on the left side is similarly acquired by appropriately reversing the description relating to the light that passes through the first opening/closing portion $31_{p+1}$, and thus the description thereof will not be presented.

The values of the distance Y2 and the distance DP are set to predetermined values based on the specifications of the display device 3. In addition, the value of the pixel pitch ND is determined based on the structure of the display member 10. Based on Equations (1') and (2'), the following Equations (3) and (4) are acquired for the distance Y1 and the pitch RD.

$$Y1 = Y2 \times ND/DP \tag{3}$$

$$RD = 4 \times DP \times ND/(DP+ND) \tag{4}$$

For example, when the pixel pitch ND of the display member 10 is 0.500 [mm], the distance Y2 is 1500 [mm], and the distance DP is 65.0 [mm], the distance Y1 is about 11.5 [mm], and the pitch RD is about 1.95 [mm] that is about four times the pixel pitch ND. Accordingly, the above-described "M" and "P" has the relation of M≈P×4.

As described above, the horizontal resolution of the image for each viewpoint that is split by the optical splitting unit is decreased to M/4. Thus, in the optical splitting unit, by changing the states of the first opening/closing portion 31 and the second opening/closing portion 32, a decrease in the horizontal resolution is alleviated.

Figure 22:
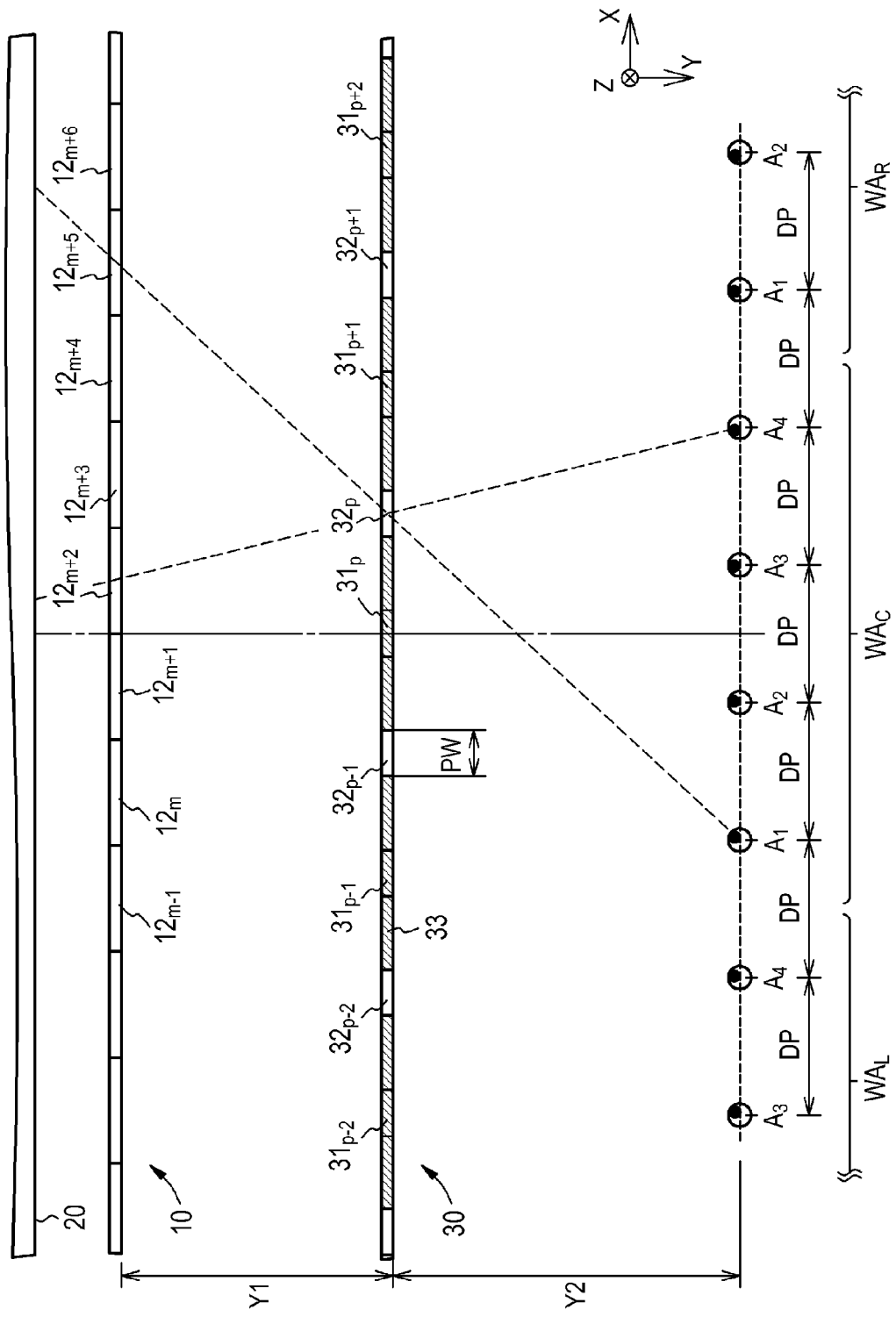
FIG. 22 is a schematic diagram illustrating light of a pixel that is transmitted through a second opening/closing portion and travels toward viewpoints $A_1$ to $A_4$.

FIG. 22 is a schematic diagram illustrating light of a pixel that is transmitted through the second opening/closing portion and travels toward the viewpoints $A_1$ to $A_4$.

In FIG. 22, the second opening/closing portion 32 is in the light transmitting state, and the first opening/closing portion 31 and the third opening/closing portion 33 are in the light shielding state.

In such a case, for example, light emitted from pixels $12_{m+5}$, $12_{m+4}$, $12_{m+3}$, and $12_{m+2}$ is transmitted through the second opening/closing portion $32_p$ and travels toward the viewpoints $A_1$, $A_2$, $A_3$, and $A_4$ of the observation area $WA_C$ located at the center. Accordingly, in FIGS. 21 and 22, the pixels facing each view point are shifted by two pixels. Therefore, by combining the state illustrated in FIG. 21 and the state illustrated in FIG. 22, the horizontal resolution of an image for each viewpoint is M/2.

FIG. 23 is a schematic diagram illustrating the scanning of the illumination member and the operation of the optical splitting unit according to the third embodiment.

In the third embodiment, one frame period is configured by a first field period and a second field period. In the first field period, the first opening/closing portion 31 of the optical splitting unit 30 is in the light transmitting state, and the second opening/closing portion 32 and the third opening/closing portion 33 are in the light shielding state. In addition, in the second field period, the second opening/closing portion 32 of the optical splitting unit 30 is in the light transmitting state, and the first opening/closing portion 31 and the third opening/closing portion 33 are in the light shielding state.

The operations of the display member 10 and the illumination member 20 in each field period are similar to the above-described operations performed in the frame period in the first embodiment. In the image displayed on the display member 10 in each field period, the image separation characteristics are decreased. Accordingly, since the error in parallax information of an image that is visually recognized at each viewpoint is decreased, a satisfactory stereoscopic image can be visually recognized.

As above, although preferred embodiments of the present disclosure have been described, the present disclosure is not limited to the embodiments. The configurations and the structures of the display devices described in the embodiments are examples and can be appropriately changed.

In the third embodiment, although the opening/closing portion of the optical splitting unit is formed in the shape of a row extending in the vertical direction, for example, a configuration may be employed in which the opening/closing portion obliquely extends so as to form an angle with respect to the vertical direction. In such a case, by arranging pin-hole shaped opening/closing portions so as to be obliquely connected to each other, a configuration may be employed in which the opening/closing portions obliquely extending on the whole are configured.

In addition, the technology of the present disclosure may be implemented as the following configurations.

(1) A display device including: a transmission-type display member having a display area that is sequentially scanned; and an illumination member that is arranged on a rear face of the display member and includes a plurality of illumination units that are arranged so as to be aligned in a direction from one end portion side toward the other end portion side along a direction in which the display area is sequentially scanned. The illumination unit is in a light emitting state over a predetermined light emitting period after sequential scanning of display units formed from a portion of the display area, which corresponds to the illumination unit, is completed, and the illumination units are sequentially scanned from one end portion side to the other end portion side in accordance with the sequential scanning of the display area, and a length of a waiting time from when the sequential scanning of the display unit is completed to when the corresponding illumination unit is in the light emitting state is set to be nonlinearly decreased in accordance with a sequence of the scanning of the illumination units at least in an area located on one end portion side.

(2) The display device described in (1), wherein the length of the waiting time is set to be nonlinearly decreased in accordance with the sequence of the scanning of the illumination units in an area located on the one end portion side and an area located on the other end portion side.

(3) The display device described in (1) or (2), wherein a period from when the illumination unit located on one end portion side is in the light emitting state to when the illumination unit located on the other end portion side is in the light emitting state is shorter than a period from the start to the end of the sequential scanning for the display area.

(4) The display device described in any one of (1) to (3), wherein the light emitting period of the illumination unit arranged in an area located on the end portion side is set to be shorter as the illumination unit is closer to the end portion side.

(5) The display device described in any one of (1) to (4), wherein the illumination member includes three or more of the illumination units.

(6) The display device described in any one of (1) to (5), wherein the display member is formed from a liquid crystal display panel.

(7) The display device described in any one of (1) to (6), wherein an optical splitting unit that is used for splitting an image displayed on the display member into images for a plurality of viewpoints is further included.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
   a transmission-type display member having a display area that is sequentially scanned; and
   an illumination member that is arranged on a rear face of the display member and includes a plurality of illumination units that are arranged so as to be aligned in a direction from one end portion side toward the other end portion side along a direction in which the display area is sequentially scanned,
   wherein at least one of the plurality of illumination unit is in a light emitting state over a predetermined light emitting period after sequential scanning of display units formed from a portion of the display area, which corresponds to the illumination unit, is completed, and the illumination units are sequentially scanned from one end portion side to the other end portion side in accordance with the sequential scanning of the display area, and
   wherein a length of a waiting time from when the sequential scanning of the display unit is completed to when the corresponding illumination unit is in the light emitting state is set to be nonlinearly decreased in accordance with a sequence of the scanning of the illumination units at least in an area located on one end portion side.

2. The display device according to claim 1, wherein the length of the waiting time is set to be nonlinearly decreased in accordance with the sequence of the scanning of the illumination units in an area located on the one end portion side and an area located on the other end portion side.

3. The display device according to claim 1, wherein a period from when the illumination unit located on one end portion side is in the light emitting state to when the illumination unit located on the other end portion side is in the light emitting state is shorter than a period from the start to the end of the sequential scanning for the display area.

4. The display device according to claim 1, wherein the light emitting period of the illumination unit arranged in an area located on the end portion side is set to be shorter as the illumination unit is closer to the end portion side.

5. The display device according to claim 1, wherein the illumination member includes three or more of the illumination units.

6. The display device according to claim 1, wherein the display member is formed from a liquid crystal display panel.

7. The display device according to claim 1, further comprising an optical splitting unit that is used for splitting an image displayed on the display member into images for a plurality of viewpoints.

8. A display device comprising:
   a display member that includes a plurality of display units; and
   an illumination member that includes a plurality of illumination units arranged on a rear face of the display member,
   wherein at least one of the plurality of illumination unit is in a light emitting state after completion of scanning of the display unit corresponding to the illumination unit, and
   wherein a length of a waiting time from when the scanning of the display units is completed to when the corresponding illumination unit is in the light emitting state is nonlinearly decreased in accordance with a sequence of the scanning of the illumination units.

* * * * *